United States Patent [19]
Terashima et al.

[11] Patent Number: 5,926,296
[45] Date of Patent: *Jul. 20, 1999

[54] VECTOR NORMALIZING APPARATUS

[75] Inventors: Mikihiko Terashima, Tokyo; Takeshi Hashimoto, Hidaka, both of Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/807,505

[22] Filed: Feb. 27, 1997

[30] Foreign Application Priority Data

Feb. 28, 1996 [JP] Japan ................................. 8-041297

[51] Int. Cl.⁶ ............................. G06E 3/00; G06K 9/64
[52] U.S. Cl. ........................... 359/107; 382/157; 706/40
[58] Field of Search ................................... 359/107, 108; 395/25, 869, 870; 364/822; 382/157; 706/40

[56] References Cited

U.S. PATENT DOCUMENTS

| | | | |
|---|---|---|---|
| 5,276,771 | 1/1994 | Manukian et al. | 395/24 |
| 5,283,838 | 2/1994 | Togawa et al. | 395/23 |
| 5,383,042 | 1/1995 | Robinson | 359/108 |
| 5,715,336 | 2/1998 | Tanaka | 382/301 |

FOREIGN PATENT DOCUMENTS 5-35897  2/1993  Japan.
5-101025 4/1993  Japan.

OTHER PUBLICATIONS

Optical engineering/Sep. 1990/vol. 29 No. 9 "Self–Organizing Optical Neural NWTwork For Unsupervised Learning" Taiwei Lu et al. pp. 1107–1113.

Applied Optics/vol. 33, No. 2/Jan. 10, 1994 "All–Optical Implementation of a Self–Organizing Map: A Preliminary Approach" J. Duvillier et al. pp. 258–266.

*Primary Examiner*—Jon Henry
*Attorney, Agent, or Firm*—Pillsbury Madison & Sutro LLP

[57] ABSTRACT

A vector normalizing apparatus which normalizes an input vector or weight vectors by $L_2$-norm and adds norm information to the vector before it is normalized. Vector data from an input vector acquiring device (1) is displayed on an input vector display device (2) and transmitted through a vector transmitting device (3) to a normalized vector output device (4). During the transmission of the vector data, $L_2$-norm of the vector data is calculated by an $L_2$-norm calculating device (5) including a vector component squaring device (7) for squaring each of the components of the displayed vector, a summation device (8) for calculating a total sum of the squared components, and a square-root calculating device (9) for calculating $L_2$-norm by obtaining a square root of the result of the summation. The input vector is normalized by a vector component adjusting device (6) using the calculated value of $L_2$-norm. Thus, the input vector normalized by the $L_2$-norm is delivered onto the normalized vector output device (4).

20 Claims, 21 Drawing Sheets

⟨Euclidean distance⟩ d1 < d2  m1 Winner element
⟨Inner product⟩ D1 < D2  m2 Winner element ⟨Euclidean distance⟩  d1>d2  m2  Winner element
⟨Inner product⟩  D1>D2  m1  Winner element ⟨Euclidean distance⟩  d1<d2  m1  Winner element
⟨Inner product⟩  D1>D2  m1  Winner element ⟨Euclidean distance⟩  d1 > d2  m2 Winner element
                                =
⟨Inner product⟩     D1 < D2  m2 Winner element

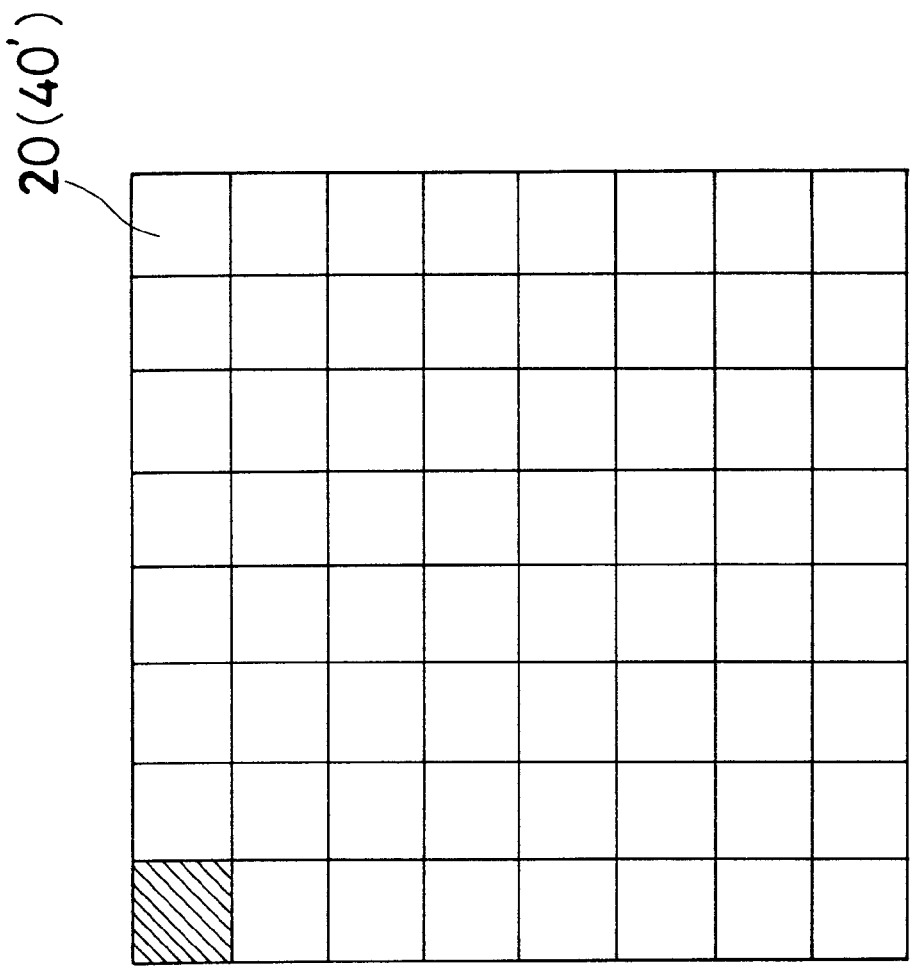
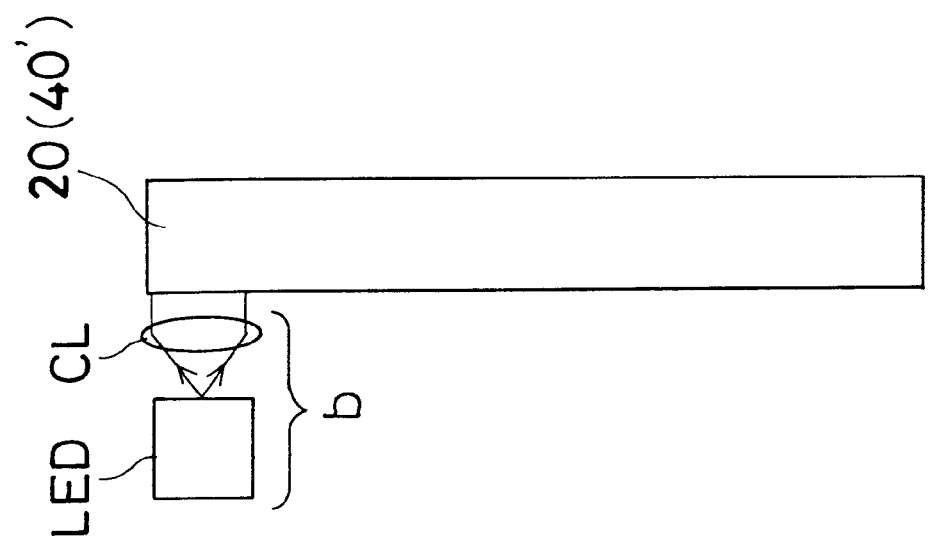

VECTOR NORMALIZING APPARATUS

BACKGROUND OF THE INVENTION

The present invention relates to a vector normalizing apparatus and, more particularly, to a vector normalizing apparatus essential for executing effective competitive learning in an optical competitive learning system wherein competitive learning for topological mapping or pattern recognition is executed by deciding a winner element meeting a certain distance measure using an inner product operation, and then performing some operation on the winner element and some elements determined by the winner element.

There are well known competitive learning algorithms that execute topological mapping or pattern recognition by deciding a winner element that meets a certain distance measure, and performing some operation on the winner element and some elements determined by the winner element (T. Kohonen, "Self-Organization and Associative Memory", Third Edition, Springer-Verlag, Berlin, 1989).

These algorithms have a competitive process for selecting a winner element that meets a distance measure, e.g. the Euclidean distance, the Manhattan distance, or the inner product, with respect to a certain input. In a case where the above-described competitive learning program is executed on a computer, any distance measure can be readily used; however, the Euclidean distance is frequently used, which is generally reported to exhibit excellent performance as a distance measure. However, it takes a great deal of time to process large-capacity data, e.g. images.

To perform a Euclidean distance calculation on hardware in order to process large-capacity data, e.g. image, at high speed, it is necessary to use an electrical difference circuit, an electrical square circuit, an electrical summation circuit. Accordingly, the overall size of the circuits becomes exceedingly large; therefore, it is difficult to realize a Euclidean distance calculation on hardware in the present state of the art. If an algorithm using the inner product as a distance measure is realized by using an optical system, high-speed processing can be effectively performed because it is possible to realize an inner product operation while taking full advantage of the nature of light, i.e. high-speed and parallel propagation. Some competitive learning systems that execute an inner product operation by an optical system have already been proposed [e.g. Taiwei et al. "Self-organizing optical neural network for unsupervised learning", Opt. Eng. VOL.29, No.9, 1990; J. Duvillier et al., "All-optical implementation of a self-organizing map", Appl. Opt. Vol.33, No.2, 1994; and Japanese Patent Application Unexamined Publication (KOKAI) Nos. 5-35897 and 5-101025].

When competitive learning is performed by using the inner product as a distance measure, the accuracy of competitive learning tends to become lower than in the case of using the Euclidean distance. This may be explained as follows.

As shown in FIG. 1, let us assume a two-dimensional vector X as an input vector and candidates $m_1$ and $m_2$ for a weight vector meeting a certain distance measure with respect to X. When the Euclidean distance is used, a weight vector which is at the shortest distance from the input vector becomes a winner element; therefore, $m_1$ becomes a winner element because $d_1 < d_2$.

When the inner product is used, a weight vector having the largest inner product value is equivalently most similar to the input vector and becomes a winner element. In FIG. 1, the inner product value is expressed by the product of the orthogonal projection $D_i$ (i=1, 2) on X of $m_i$ (i=1, 2) and $L_2$-norm of X. It should be noted that $L_2$-norm represents the square root of the square sum of vector components. Size comparison between the inner products can be made by comparing the sizes of $D_i$. However, in this case, $D_1 < D_2$, and hence, $m_2$ is unfavorably selected as a winner element.

Thus, when the inner product is used, even if a weight vector with large $L_2$-norm is at a relatively long Euclidean distance from the input vector, the inner product value may become relatively large, resulting in a higher degree of similarity. Accordingly, such a weight vector is likely to become a winner. That is, the degree of similarity in the inner product depends on $L_2$-norm of each vector. Therefore, it is impossible to perform competitive learning of high accuracy.

On the other hand, the systems disclosed in Japanese Patent Application Unexamined Publication (KOKAI) Nos. 5-35897 and 5-101025 are intended to increase the accuracy of competitive learning using the inner product operation by adjusting the size of the input vector components. More specifically, in a vector normalizing apparatus shown in FIG. 2, an input vector is displayed on an intensity modulation type MSLM 100, and the intensity value of the displayed vector is detected by a light-receiving element 101. A current value thus obtained is converted into a voltage value by an amplifier 102 to vary the driving voltage applied to the MSLM 100, thereby effecting normalization such that the intensity value is constant. This corresponds to so-called normalization by $L_1$-norm where the sum of the vector components is fixed at a constant value.

Let us show that the accuracy of competitive learning cannot satisfactorily be increased by the normalization by $L_1$-norm. Let us assume that, as shown in FIG. 3, a two-dimensional vector X is entered, and $m_1$ and $m_2$ are candidates for a weight vector with respect to the input vector X, as in the case of FIG. 1. It should be noted that in all the vectors X, $m_1$, and $m_2$, the sum of vector components is fixed at a constant value. When the Euclidean distance is used, a weight vector which is at the shortest distance from the input vector becomes a winner element; therefore, $m_2$ becomes a winner element. However, when the inner product is used, $m_1$ becomes a winner element from the relation of $D_1 > D_2$. Accordingly, even if normalization is effected by $L_1$-norm, the degree of similarity in the inner product still depends on $L_2$-norm of each vector. Therefore, it is impossible to perform competitive learning of high accuracy. The systems according to the prior art, i.e. Taiwei et al. "Self-organizing optical neural network for unsupervised learning", Opt. Eng. VOL.29, No.9, 1990 and J. Duvillier et al., "All-optical implementation of a self-organizing map", Appl. Opt. Vol.33, No.2, 1994, also use the normalization by $L_1$-norm, which is similar to the above, and are incapable of performing competitive learning of high accuracy.

SUMMARY OF THE INVENTION

In view of the above-described problems, an object of the present invention is to provide a vector normalizing apparatus used to perform similarity discrimination of higher accuracy.

To attain the above-described object, the present invention provides a vector normalizing apparatus for normalizing an input vector or a group of weight vectors for an optical competitive learning system which calculates an inner product of the input vector and each vector in the group of weight vectors to thereby associate the input vector with one vector in the group of weight vectors. The vector normalizing apparatus has an $L_2$-norm calculating device and a vector component adjusting device. The input vector or weight vector is normalized by the vector component adjusting device using an output delivered from the $L_2$-norm calculating device.

The above-described vector normalizing apparatus corresponds to first to fourth embodiments (described later).

An input vector or weight vector entered into the vector normalizing apparatus is entered into the $L_2$-norm calculating device where $L_2$-norm is calculated. The entered vector components are divided by the vector component adjusting device using the calculated $L_2$-norm. As a result, the entered vector is normalized by $L_2$-norm. If the input vector or weight vector is normalized by $L_2$-norm as described above, effective competitive learning using the inner product can be performed with a degree of accuracy substantially equal to that in the case of using the Euclidean distance. This can be confirmed by an example shown in FIG. 1.

If the input vector and weight vectors in FIG. 1 are normalized by $L_2$-norm, as shown in FIG. 4, the relations of $d_1<d_2$ and $D_1>D_2$ are obtained. Consequently, $m_1$ becomes a winner element whether the Euclidean distance or the inner product is used. In the example shown in FIG. 3 also, if input data and weight data are normalized by $L_2$-norm, as shown in FIG. 5, the relations of $d_1>d_2$ and $D_1<D_2$ are obtained. Consequently, $m_2$ becomes a winner element whether the Euclidean distance or the inner product is used. It should be noted that even if only one of the input vector and the group of weight vectors is normalized, competitive learning can be performed with a certain degree of accuracy. However, competitive learning of higher accuracy can be performed by normalizing both the input and weight vectors as described above.

Thus, normalization of the input vector or the weight vectors by $L_2$-norm makes it possible to perform effective competitive learning using the inner product with a degree of accuracy substantially equal to that in the case of using the Euclidean distance as a distance measure.

In the above-described arrangement, it is desirable for the $L_2$-norm calculating device to include a vector component squaring device for squaring each of the vector components, a summation device for calculating a total sum of the squared vector components, and a square-root calculating device for calculating a square root of the result of the summation.

The vector normalizing apparatus arranged as described above also corresponds to the first to fourth embodiments (described later).

The input vector or weight vector entered into the vector normalizing apparatus is entered into the $L_2$-norm calculating device. In the $L_2$-norm calculating device, first, each of the vector components is squared by the vector component squaring device. Subsequently, a total sum of the squared vector components is calculated by the summation device. The square-root calculating device calculates a square root of the total sum. The output of the square-root calculating device is equivalent to the $L_2$-norm of the vector. Subsequently, the components of the entered vector are divided by the calculated $L_2$-norm. As a result, the entered vector is normalized by $L_2$-norm.

In this case, the vector component squaring device may be optically formed by using, for example, two display devices for displaying the vector components two-dimensionally, and a read device for reading one of the display devices through the other display device. Alternatively, the vector component squaring device may be optically formed by using a display device having a square approximation region in input-output characteristics thereof, and a read device for reading the display device.

Incidentally, normalization of a vector is a process in which the components of the vector are divided by norm. Therefore, the norm information is lost by normalization. In the case of competitive learning for identifying only the direction of vector data, the norm information of the data may be lost. However, ordinary competitive learning is not always performed to identify only the direction of vector data; in many cases, satisfactory learning cannot be effected if the norm information is lost. One approach to solve this problem is to add norm information to the vector before normalization is performed.

Accordingly, to add information concerning the norm of the entered vector, the above-described vector normalizing apparatus according to the present invention may further have, in a stage preceding the stage where the entered vector is normalized by $L_2$-norm, a norm information generating device including a second norm calculating device and a norm information calculating device, and a norm information adding device for adding an output delivered from the norm information generating device to the entered vector.

The vector normalizing apparatus arranged as described above corresponds to a fifth embodiment (described later).

In the above-described vector normalizing apparatus according to the present invention, before the entered input vector or weight vector is normalized by $L_2$-norm, the norm information generating device generates norm information concerning the entered vector. The norm information generating device includes a norm calculating device and a norm information calculating device. The norm calculating device calculates the norm of the entered vector, and the norm information calculating device outputs a value obtained by applying a certain function to the norm. The norm information adding device adds the norm information of the entered vector generated by the norm information generating device in such a manner that a dimension is added to the vector. The vector with an increased number of dimensions by having the norm information added thereto is sent to the above-described vector normalizing apparatus according to the present invention where it is normalized by $L_2$-norm.

The vector normalized by $L_2$-norm can be used for similarity discrimination using the inner product. In this case, because the vector components contain the norm information, not only information concerning the direction of the entered vector but also the norm information remains after the normalization. Accordingly, it is possible to perform competitive learning using the inner product without losing the norm information of the entered data by normalizing the vector, which has an increased number of dimensions by having the norm information added thereto, by $L_2$-norm, and using the normalized vector as a new input vector or weight vector. It should be noted that the norm information that is added to the vector in order to prevent the loss of norm information may be any norm information in general, i.e. whether $L_2$-norm or $L_1$-norm.

The vector normalizing apparatus may further have a second vector component adjusting device to normalize the entered vector by using the output of the second norm calculating device before the output of the norm information generating device is added to the entered vector.

The vector normalizing apparatus arranged as described above also corresponds to the fifth embodiment (described later).

In the above-described vector normalizing apparatus, the entered vector is normalized by using the output of the second norm calculating device, and the output of the norm information generating device is added to the normalized vector.

By doing so, the entered vector components and the added norm information become uniform in size to a certain extent. This is advantageous in implementation on hardware because the components can be made uniform in dynamic range, by way of example.

In the foregoing, the vector normalizing apparatus according to the present invention has been briefly described in terms of the action and effect with regard to two arrangements: one in which, in order to add information concerning the norm of the entered vector, the apparatus further has, in a stage preceding the stage of normalizing the entered vector by $L_2$-norm, a norm information generating device including a second norm calculating device and a norm information calculating device, and a norm information adding device for adding the output of the norm information generating device to the entered vector; and another in which the apparatus further has a second vector component adjusting device for normalizing the entered vector by using the output of the second norm calculating device before the output of the norm information generating device is added to the entered vector. For the sake of clarity, the vector normalizing apparatus according to the present invention will be described below more specifically by using mathematical expressions and drawings.

As has been stated above, similarity discrimination using the inner product can be effected by normalizing the input vector or the weight vectors by $L_2$-norm. In the normalization, the original norm information is lost because the vector is divided by $L_2$-norm to form a unit vector. For example, assuming a uniform distribution of two-dimensional vector data such as that shown in FIG. 6, if normalization is performed by $L_2$-norm, points on a curve such as that shown in FIG. 7 become input data. In other words, all points lying in a direction intersecting the origin and a data point are represented by one point on the curve. Consequently, the norm information of the vector is lost, but only the direction information remains. Therefore, it is necessary in order to prevent the loss of the original norm information to add a norm-indicating component to the components of the entered vector. For example, let us assume that the input data is a two-dimensional vector $X=(x,y)$. $L_2$-norm is $D=\sqrt{(x^2+y^2)}$. Normalizing the input data gives $X/|X|=(x/D,y/D)$. This is the normalized entered vector used for similarity discrimination using the inner product in the vector normalizing apparatus according to the present invention. A component f(D) indicating norm information is added to the vector to produce $X'=(x/D,y/D,f(D))$. Next, X' is normalized to produce $X''=X'/|X'|$, and this is defined as entered vector data in place of X.

That is, $$X = (x, y), D = \sqrt{(x^2 + y^2)} \quad (1)$$

$$X'=(x/D,y/D,f(D)) \quad (2)$$

$$X''=X'/|X'| \quad (3)$$

X" is vector data normalized by $L_2$-norm and therefore capable of being used for similarity discrimination using the inner product. Moreover, because the norm information f(D) is contained in the components of the vector X", not only the input vector direction information but also the norm information remains after the normalization. Accordingly, if X" is defined as an entered vector in place of $X=(x,y)$, it is possible to perform competitive learning without losing the norm information of the entered vector even when the inner product is used as a distance measure.

The above discussion has been held on a case where after the vector X has been normalized by $L_2$-norm, information f(D) concerning norm is added to X to produce X', and X' is normalized by $L_2$-norm to produce a final output vector X". However, there may also be a case where norm information (denoted by g(D)) is added to the vector X without being normalized by $L_2$-norm to produce Z', and Z' is normalized by $L_2$-norm to produce a final output vector Z".

Specific expressions are as follows:

$$X = (x, y), D = \sqrt{(x^2 + y^2)} \quad (a)$$

$$Z'=(x,y,g(D)) \quad (b)$$

$$Z''=Z'/|Z'| \quad (c)$$

It will be understood that if g(D) is changed to Df(D) by using f(D) stated in the above discussion, X" in Eq.(3) and Z" in Eq.(c) are mathematically coincident with each other. In this case, it is supposed that the input vector X in Eq.(1) and the input vector X in Eq.(a) are identical with each other. Therefore, it can be said that even when Z" is used as input data in place of $X=(x,y)$, it is possible to perform competitive learning without loss of the norm information of the input data by using the inner product as a distance measure.

To avoid confusion, it is assumed in the following discussion that norm information added when transformation of expressions (1) to (3) is performed is denoted by f(D), and norm information added when transformation of expressions (a) to (c) is performed is denoted by g(D). It should be noted that if g(D) is set equal to Df(D), the two transformations have mathematically the same function.

It is desirable to use a decreasing function as a function f(D) used in the norm information calculating device in a case where the vector normalizing apparatus has a second vector component adjusting device to normalize the entered vector by using the output of the second norm calculating device before the output of the norm information generating device is added to the entered vector.

The vector normalizing apparatus arranged as described above also corresponds to the fifth embodiment (described later).

In this case, the norm information calculating device uses a decreasing function as a function f(D) applied to the norm quantity calculated by the norm calculating device. The reason for using a decreasing function will be described below in detail. Let us examine, with regard to some functions for f(D), the correspondence between a two-dimensional vector as input data and a three-dimensional vector obtained by adding a norm-indicating component to the two-dimensional vector. First, a) f(D)=D and b) f(D)=1/D are selected as simple increasing and decreasing functions, respectively. FIG. 8 shows points $A_1$, $B_1$, $A_2$, and $B_2$ of X in a two-dimensional plane. FIGS. 9 and 10 each show the way in which the points $A_1$, $B_1$, $A_2$, and $B_2$ in FIG. 8 are transformed to points of X" in a three-dimensional space. In either of FIGS. 9 and 10, one-to-one correspondence of mapping is established, and there is neither collapse nor distortion of the ordinal relationship between the points $A_1$, $B_1$, $A_2$, and $B_2$. In other words, it can be said that in either of FIGS. 9 and 10, the ordinal relationship has been topologically preserved. In FIG. 10, the topological distance relationships have also been preserved. The reason for this will be described below.

In distance comparison in the two-dimensional plane shown in FIG. 8, the distance between $A_1$ and $B_1$ is shorter than the distance between $A_2$ and $B_2$. In comparison of the respective transformed points in the three-dimensional space, in FIG. 10, the distance between the points $A_1$41 and $B_1"$, which respectively correspond to $A_1$ and $B_1$, is shorter than the distance between the points $A_2"$ and $B_2"$, which respectively correspond to $A_2$ and $B_2$, whereas, in FIG. 9, the distance relationship is opposite to that in FIG. 10. Thus, FIG. 10 also reflects the distance relationships in the two-dimensional plane.

Consideration of general f(D) reveals that if a decreasing function is used as f(D), the distance between the points corresponding to $A_1$ and $B_1$ can be made shorter than the distance between the points corresponding to $A_2$ and $B_2$ as shown in FIG. 10, as in the case of f(D)=1/D, and that if an increasing function is used as f(D), the opposite relationship to that in FIG. 10 is established as in the case of f(D)=D. Therefore, it will be understood that, in general, a decreasing function preserves the topological distance relationships better than an increasing function. This will be discussed again in the supplementary explanation of Eqs.(10) and (11) in the following description.

Thus, it is possible to perform effective competitive learning in which the topological distance relationships are preserved by using in the norm information calculating device a decreasing function as a function f(D) applied to a norm quantity calculated by the norm calculating device.

In the above case, a decreasing function used in the norm information calculating device may be given by $$f(D) = \{(\cos kD - \cos \Delta\theta)/(1 - \cos kD)\}^{1/2}$$

where D is $L_2$-norm; f(D) is a function of $L_2$-norm D; and k and $\Delta\theta$ are arbitrary constants, respectively.

The vector normalizing apparatus arranged as described above also corresponds to the fifth embodiment (described later).

It has been shown in the foregoing description that it is desirable for the norm information calculating device to use a decreasing function as a function f(D) applied to a norm quantity calculated in the norm calculating device. However, the use of a function given by the above equation makes it possible to perform even more effective competitive learning.

This will be described below in detail. Let us consider the four points $A_1$, $B_1$, $A_2$, and $B_2$ in FIG. 8 again. In order to obtain the same result as that in the case of using the Euclidean distance, the ratio between line segments in the two-dimensional plane must be preserved in the three-dimensional space as well. The condition for this matter will be shown below using expressions.

First, the coordinates of the four points $A_1$, $B_1$, $A_2$, and $B_2$ and norms $D_1$ and $D_2$ are given by $$A_1 = (r_1 \cos \theta_A, r_1 \sin \theta_A)$$

$$A_2 = (r_2 \cos \theta_A, r_2 \sin \theta_A)$$

$$B_1 = (r_1 \cos \theta_B, r_1 \sin \theta_B)$$

$$B_2 = (r_2 \cos \theta_B, r_2 \sin \theta_B)$$

$$D_1 = r_1, \quad D_2 = r_2 \qquad (4)$$

These coordinates correspond to the input vector X=(x,y). This vector is normalized, and a component indicating norm information is added thereto to produce X'=(x/D,y/D,f(D)), which is given by $$A_1' = (\cos \theta_A, \sin \theta_A, f(D_1))$$

$$A_2' = (\cos \theta_A, \sin \theta_A, f(D_2))$$

$$B_1' = (\cos \theta_B, \sin \theta_B, f(D_1))$$

$$B_2' = (\cos \theta_B, \sin \theta_B, f(D_2)) \qquad (5)$$

X' is normalized to produce X", which is given by $$A_1'' = (\cos \theta_A, \sin \theta_A, f(D_1))/\{1+f(D_1)^2\}^{1/2}$$

$$A_2'' = (\cos \theta_A, \sin \theta_A, f(D_2))/\{1+f(D_2)^2\}^{1/2}$$

$$B_1'' = (\cos \theta_B, \sin \theta_B, f(D_1))/\{1+f(D_1)^2\}^{1/2}$$

$$B_2'' = (\cos \theta_B, \sin \theta_B, f(D_2))/\{1+f(D_2)^2\}^{1/2} \qquad (6)$$

On the surface of $x^2+y^2+z^2=1$ in the three-dimensional space, the length of the arc between $A_1"$ and $B_1"$ and the length of the arc between $A_2"$ and $B_2"$ are given by the following expressions (7) and (8), respectively (arc is expressed by using < >, such as <$A_1"B_1"$>). Here, let us consider the position vectors of $A_1"$, $B_1"$, $A_2"$, and $B_2"$ (vector is expressed by using underline, such as $\underline{A_1}\Delta$).

$$\langle A_1''B_1''\rangle = \cos^{-1}\{\underline{A_1}'' \cdot \underline{B_1}''/(|\underline{A_1}''||\underline{B_1}''|)\} \qquad (7)$$
$$= \cos^{-1}[\{\cos\theta_A\cos\theta_B + \sin\theta_A\sin\theta_B + f(D_1)^2\}/\{1+f(D_1)^2\}]$$
$$= \cos^{-1}[\{\cos(\theta_A - \theta_B) + f(D_1)^2\}/\{1+f(D_1)^2\}]$$
$$= \cos^{-1}[\{\cos\Delta\theta + f(D_1)^2\}/\{1+f(D_1)^2\}]$$

$$\langle A_2''B_2''\rangle = \cos^{-1}[\{\cos\Delta\theta + f(D_2)^2\}/\{1+f(D_2)^2\}] \qquad (8)$$

The ratio of the length of the line segment between $A_1$ and $B_1$ to the length of the line segment between $A_2$ and $B_2$ in the two-dimensional plane is given by $$|A_1 - B_1| : |A_2 - B_2| = r_1 : r_2 = D_1 : D_2 \qquad (9)$$

When the ratio of the length of the line segment $A_1B_1$ to the length of the line segment $A_2B_2$ is equal to the ratio of the length of <$A_1"B_1"$> to the length of <$A_2"B_2"$>, as shown by Eq.(9), the following Eq.(10) holds:

$$|A_1 - B_1|/|A_2 - B_2| = <A_1''B_1''>/<A_2''B_2''> \qquad (10)$$

Substituting Eqs.(7), (8), and (9) into Eq.(10) gives $$D_1/D_2 = \cos^{-1}[\{\cos\Delta\theta + f(D_1)^2\}/\{1+f(D_1)^2\}] \div \cos^{-1}[\{\cos\Delta\theta + f(D_2)^2\}/\{1+f(D_2)^2\}] \qquad (11)$$

By using a proportional constant k (k≠0), Eq.(11) can be written as follows:

$$kD_i = \cos^{-1}[\{\cos \Delta\theta + f(D_i)^2\}/\{1+f(D_i)^2\}](i=1, 2) \qquad (12)$$

Solving Eq.12 for f($D_i$) gives $$f(D_i) = \{(\cos kD_i - \cos \Delta\theta)/(1 - \cos kD_i)\}^{1/2}(i=1, 2) \qquad (13)$$

Here, it is necessary to meet the following constraint (14) in order for the sign of quantity in each of the definitions and radicals of various quantities to be positive.

$$\cos kD_i - \cos \Delta\theta > 0, \ 0 < kD_i < \pi/2 \ (i=1, 2) \quad (14)$$

Although the foregoing description has been given with regard to two-dimensional input data, the system can be readily extended for n-dimensional input vectors in general. Moreover, because i (=1, 2) in Eqs.(13) and (14) can be removed without loss of generality, i (=1, 2) is omitted in the following discussion.

The meaning of Eqs.(13) and (14) is as follows: When two arbitrary points making $\Delta\theta$ with each other in a two-dimensional plane are transformed into points in a three-dimensional space according to the above-described rules, if an expression of f(D) such as Eq.(13) is used, the ratio of line segments between such pairs of points in the two-dimensional plane is equal to the ratio of the lengths between the corresponding points on the surface of $x^2+y^2+z^2=1$ in the three-dimensional space.

It will be understood according to expression (14) that if a certain proportional constant k is determined, D will not become larger than a quantity determined by k and $\Delta\theta$. This will be qualitatively described below.

As D increases, the distance between two points in the two-dimensional plane increases without limit, but the length between the corresponding points at the base of the surface of $x^2+y^2+z^2=1$ in the three-dimensional space cannot become larger than the width of the base. Accordingly, as D becomes large, it becomes difficult to satisfy the condition.

Next, some supplementary explanation will be given of Eqs.(10) and (11). Eqs.(10) and (11) are strict conditions. However, it will be understood by considering the nature of functions that f(D) may be any function that decreases with D if it is only necessary to preserve the size relationship between the denominator and the numerator on both sides. In other words, the function is not necessarily limited to f(D)=1/D, but any decreasing function that decreases with D may be selected to preserve the topological distance relationships.

Thus, among decreasing functions, f(D) such as that represented by Eq.13 should be used to preserve the topological distance relationship even more favorably. The use of such f(D) makes it possible to perform even more effective competitive learning that preserves the topological distance relationships.

By the above discussion, f(D) for effective learning is obtained. Here, let us consider applying the function f(D) to the transformation of the above-described Eqs.(a) to (c). As has been stated above, if g(D) in Eq.(b) is set equal to Df(D), the transformation of Eqs.(a) to (c) and the transformation of Eqs.(1) to (3) have mathematically the same function. In other words, the above discussion of effective f(D) also holds for g(D).

More specifically, if the following Eq.(d) is used as g(D), effective competitive learning can be performed.

$$g(D_i)=D_i\{(\cos kD_i - \cos \Delta\theta)/(1-\cos kD_i)\}^{1/2} (i=1, 2) \quad (d)$$

It will be understood that if the expression of the radical part of Eq.(d) is approximated by $\beta/D$ ($\beta$ is a constant determined by the distribution range of D, k, $\Delta\theta$, etc.) in an appropriate range of D, g(D) can be set equal to $\beta$.

Next, some supplementary explanation will be given of a case where the function f(D) used in the norm information calculating device is a decreasing function, and a vector normalizing apparatus using f(D) such as that represented by Eq.(13) as a decreasing function. It can be confirmed by a simulation that the choice of f(D) determines the degree to which the topological distance relationships are favorably preserved. The simulation for this purpose will be described below.

Capability of favorably preserving the topological distance relationships can be shown by a topological mapping experiment using a self-organizing feature map (T. Kohonen, "Self-Organization and Associative Memory", Third Edition, Springer-Verlag, Berlin, 1989; hereinafter referred to as "SOM"). The normalizing apparatus according to the present invention is usable in any type of competitive learning system. However, let us apply it to SOM as a suitable example whereby it is possible to visually and readily make a comparison as to the capability of favorably preserving the topological distance relationships of input data.

First, SOM will be described. Then, results of simulations in which the normalizing apparatuses according to the present invention using some functions f(D) are applied to SOM will be illustrated, thereby showing that it is desirable to use a decreasing function as f(D), and that the topological distance relationships are preserved most favorably when a function f(D) such as that represented by Eq.(13) is used.

First of all, SOM will be briefly described.

As shown in FIG. 11, SOM consists essentially of a layer ML (hereinafter referred to as "map layer ML") of elements arranged two-dimensionally, and an input layer IP for inputting data. Although in FIG. 11 the map layer ML has two-dimensionally arranged elements, it is also possible to use one-dimensionally arranged elements. The input layer IP is connected to all the elements of the map layer ML, so that input data can be given to all the elements of the map layer ML. Input data may be either scalar or vector data. Here, a vector X (n-dimensional) is used as general input data. It is assumed that the map layer ML has elements i (i denotes the order on the map; the total number of elements is k), and that every element has a weight vector $m_i$ (n-dimensional). The SOM algorithm is divided into <similarity matching> in which a weight vector to be updated is decided from similarity between the input vector X and the weight vector $m_i$ of each element, and <update> in which the weight vector $m_i$ is updated so as to approach the input vector X. By repeating the two operations, a weight vector $m_i$ ($1 \leq i \leq k$) which reflects the distribution of the input vector X is produced. Specific equations expressing <similarity matching> and <update> are as follows: <Similarity matching>

<Similarity matching>

$$X \cdot m_c = \max_i X \cdot m_i \quad (15)$$

<Update>

$$m_i(t+1) = \frac{m_i(t) + \alpha(t)\{X(t) - m_i(t)\}}{|m_i(t) + \alpha(t)\{X(t) - m_i(t)\}|} \quad \text{for } i \in N_c \quad (16)$$

$$m_i(t+1) = m_i(t) \quad \text{Others}$$

where X is assumed to have been normalized; $m_i$ has also been normalized after updating; $X \cdot m_i$ is the inner product of X and $m_i$; c is the element having the largest inner product value (winner element); $N_c$ is a neighborhood of the winner element c on the map layer ML; $\alpha(t)$ is a positive constant; and t is time.

While update is repeated, the size of $\alpha(t)$ and $N_c$ are gradually made smaller. A value for $\alpha(t)$ may be selected so as to decrease with distance from the winner element c.

From the set of input vectors X, X's are selected at random and sequentially entered into the system, and updating of the weight vector $m_i$ is repeated, thereby producing a weight vector $m_i$ ($1 \geq i \geq k$) reflecting the distribution of input vectors X. That is, the weight vector $m_i$ ($1 \geq i \geq k$) is a prototype of the input vector distribution. When the weight vector of a certain element is updated so as to approach the input vector, elements in the neighborhood of that element on the map are similarly updated. Therefore, elements which are adjacent to each other on the map correspond to vectors which are also close to each other in the space of the input vector. Accordingly, the SOM algorithm can generate a set of prototypes reflecting the topological distance relationships in the input data space. The SOM algorithm has the advantageous feature that the topological distance relationships of input data can be visually seen because the map is either one- or two-dimensional.

In the above-described SOM, an inner product operation using X" is performed by changing the above function f(D). Thus, a comparison is made between various functions f(D) as to the capability of favorably preserving the topological distance relationships of input data.

Let us assume that, in SOM, elements are arranged in a two-dimensional 10×10 lattice-shaped array, and input data is a group of two-dimensional vectors X=(x,y) uniformly distributed in a square, where $0 \geq x \geq 1$, and $0 \geq y \geq 1$. Whether or not the topological distance relationships of input data are favorably preserved is decided by displaying the group of two-dimensional vectors X=(x,y) in the square discriminately for each element to which each item of the data corresponds and examining the shape of each territory. It should be noted that each pair of adjacent elements in the two-dimensional lattice-shaped array are assigned black and white colors, respectively, so that the adjacent elements can be readily distinguished.

In ordinary SOM, X=(x,y) is entered as it is, and the Euclidean distance is used as a distance measure for competitive learning. Results of processing in that case are shown in FIGS. 12(a) and 12(b). FIG. 12(b) shows a map in which the weight vectors of adjacent elements are connected to each other, and FIG. 12(a) is a map showing the territories of input vectors to which the elements correspond, respectively, (hereinafter referred to as "territory map"). Since the group of two-dimensional vectors X in the square are divided in the form of a two-dimensional lattice, the territories have a lattice structure in which small square are regularly arranged. Incidentally, the topological distance relationships of input data can be preserved most favorably by using not the inner product as a distance measure but the ordinary SOM method, i.e. by entering X=(x,y) as it is, without being normalized, and using the Euclidean distance as a distance measure for competitive learning. Let us refer the result of this method to as "standard result". It should be noted that whether or not it is possible to completely preserve the topological distance relationships of input data is a problem associated with SOM itself. It should be noted here that preserving the topological distance relationship most favorably is equivalent to obtaining the same result as that obtained by using the Euclidean distance as a distance measure for competitive learning, and it does not mean completely preserving the topological distance relationships of input data. That is, in a case where X" is entered and competitive learning is performed by using the inner product, the closer the standard result, the more favorably the topological distance relationships of input data are preserved.

SOM using the inner product as a distance measure was performed for three different cases: a) f(D)=D; b) f(D)=1/D; and c) Eq.(13). The resulting territory maps are shown in FIGS. 13(a), 13(b) and 13(c). In FIG. 13(b), the territories extend in a lattice pattern, whereas, in FIG. 13(a), the territories are disordered. Particularly, near the origin in the top left corner, the territories are radially distributed. Accordingly, it is clear that in the case of FIG. 13(b) the topological distance relationships of input data are preserved more favorably. It should be noted that the radial distribution indicates that the angle dependence of X=(x,y) is strong. The reason for this may be interpreted as follows: As has been stated above in connection with FIG. 9, the points $A_1$ and $B_1$ near the origin, which are close to each other in the two-dimensional plane, become relatively distant from each other in the three-dimensional space, and thus the angle information is emphasized more than the norm information.

When compared to those in FIG. 13(b), the territories in FIG. 13(c) are distributed in better order. This will be understood from the fact that there are 10 small areas in each of the lengthwise and breadthwise directions. It will be understood from this experiment that the use of f(D) given by Eq.(13) makes it possible to obtain a result closest to the result obtained when X=(x,y) is entered as it is and the Euclidean distance is used as a distance measure for competitive learning, i.e. it is possible to realize mapping in which the topological distance relationships of input data are preserved most favorably. It should be noted that in the experiment k=0.3 and $\Delta\theta=\pi/3$ were selected as parameters of $f(D_i)$ so as to satisfy the condition given by expression (14). Expression (14) is a condition at a certain $\Delta\theta$. Since there are various input vectors in competitive learning, $\Delta\theta$ assumes various values in accordance with each particular input vector. In an actual simulation, however, k and $\Delta\theta$ should be properly determined in advance by taking into account the maximum value of $D_i$ so that the condition (14) is satisfied. As will be understood from the result shown in FIG. 13(c), a favorable result can be obtained even if k and $\Delta\theta$ are fixed.

The foregoing is a supplementary explanation of a case where the function f(D) used in the norm information calculating device is a decreasing function, and a vector normalizing apparatus using f(D) such as that represented by Eq.(13) as a decreasing function. Further, some supplementary explanation will be given of other matters.

As an experiment with which the problems associated with the prior art can be pointed out, we carried out SOM using the inner product as a distance measure by normalizing X=(x,y) by $L_1$-norm before entering it as in the case of the systems disclosed in Japanese Patent Application Unexamined Publication (KOKAI) Nos. 5-35897 and 5-101025. A territory map obtained by the experiment is shown in FIG. 14. In the normalization by $L_1$-norm, only elements closest to end points on the straight line of x+y=const. become winners. Therefore, the space can be classified into only the number of territories which is equal to the number of dimensions (2 in this case).

Next, a supplementary explanation will be given of Eqs. (10) and (11). Eqs.(10) and (11) are strict conditions. However, it will be understood by considering the nature of functions that f(D) may be any function that decreases with D if it is only necessary to preserve the size relationship between the denominator and the numerator on both sides. In other words, it can be said that the reason why the result given by f(D)=1/D is better than that by f(D)=D is that f(D)=1/D is a decreasing function with respect to D.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 12($b$) is a map in which the weight vectors of adjacent elements are connected to each other.

FIGS. 24($a$) and 24($b$) are a side and front views, respectively, of a spatial light modulator for adding norm information.

DESCRIPTION OF THE PREFERRED EMBODIMENTS

Preferred embodiments of the present invention will be described below with reference to FIGS. 15 to 24($b$).

First of all, an embodiment of a vector normalizing apparatus according to the present invention will be described which satisfies the condition A-1) <an input vector or a group of weight vectors is normalized by $L_2$-norm to perform competitive learning using the inner product as a distance measure with a degree of accuracy substantially equal to that in a case where the Euclidean distance is used as a distance measure>. Input vector normalizing apparatuses and weight vector normalizing apparatuses can be attained by using the same arrangement. Therefore, from the viewpoint of avoiding redundant explanation, input vector normalizing apparatuses will be described below.

Figure 1:
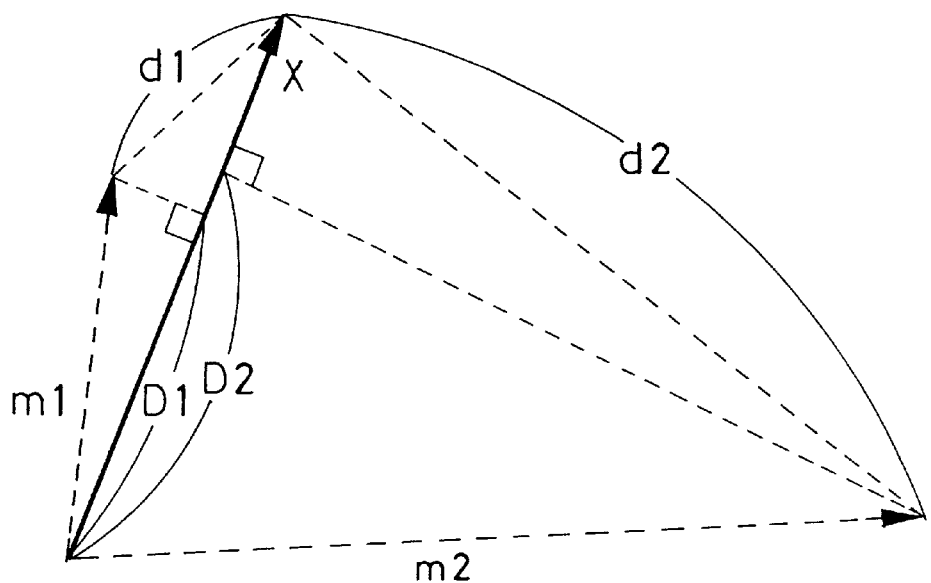
FIG. 1 shows the process of deciding a winner vector by an inner product operation in a case where vector data is not normalized.
Figure 2:
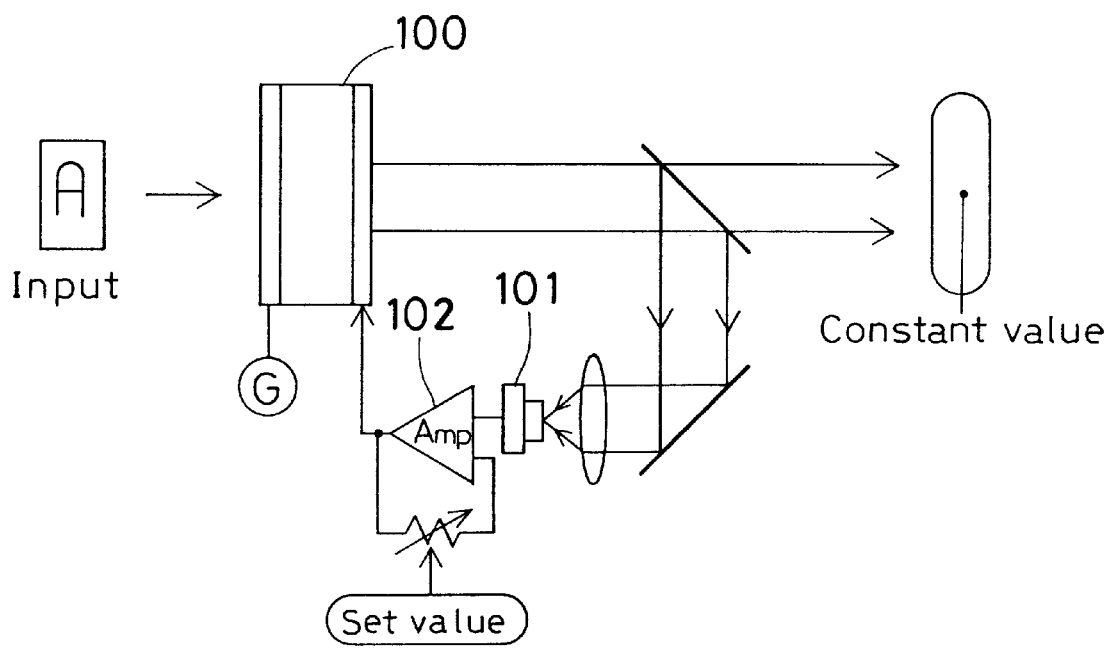
FIG. 2 is a view for describing normalization by $L_1$-norm in a conventional competitive learning system using an optical system.
Figure 3:
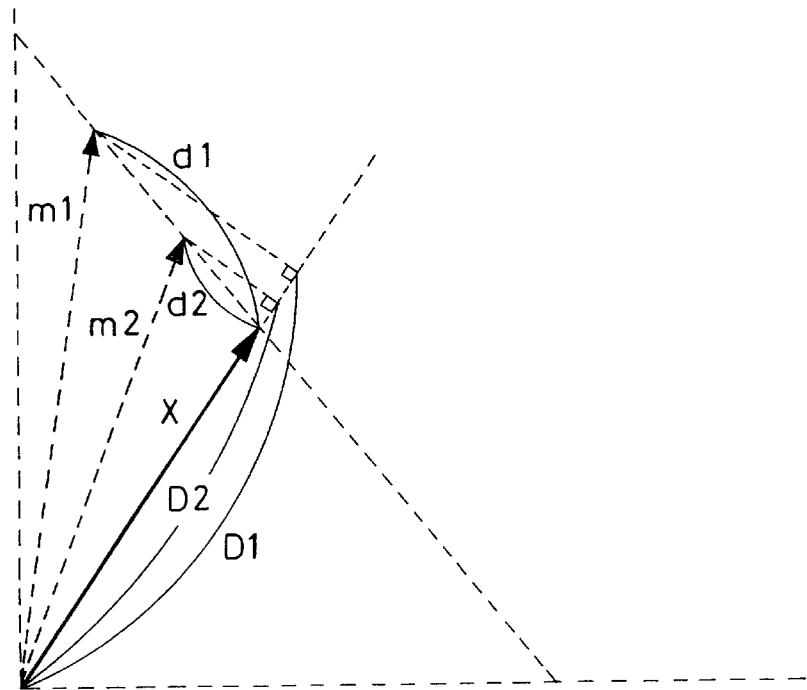
FIG. 3 shows the process of deciding a winner vector in a case where vector data is normalized by $L_1$-norm.
Figure 4:
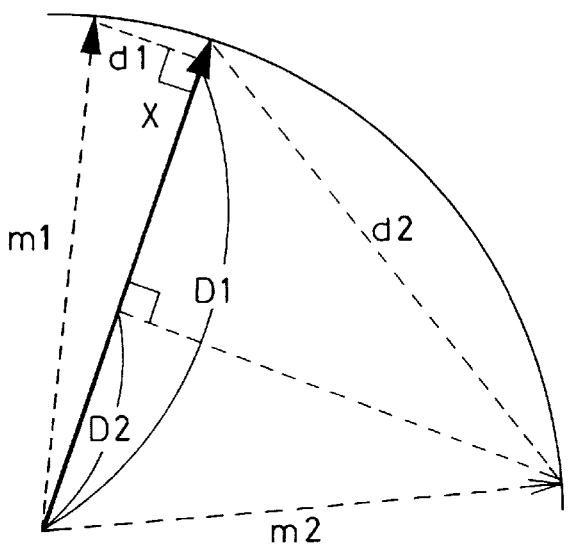
FIG. 4 shows the process of deciding a winner vector in a case where vector data is normalized by $L_2$-norm in the case of FIG. 1.
Figure 5:
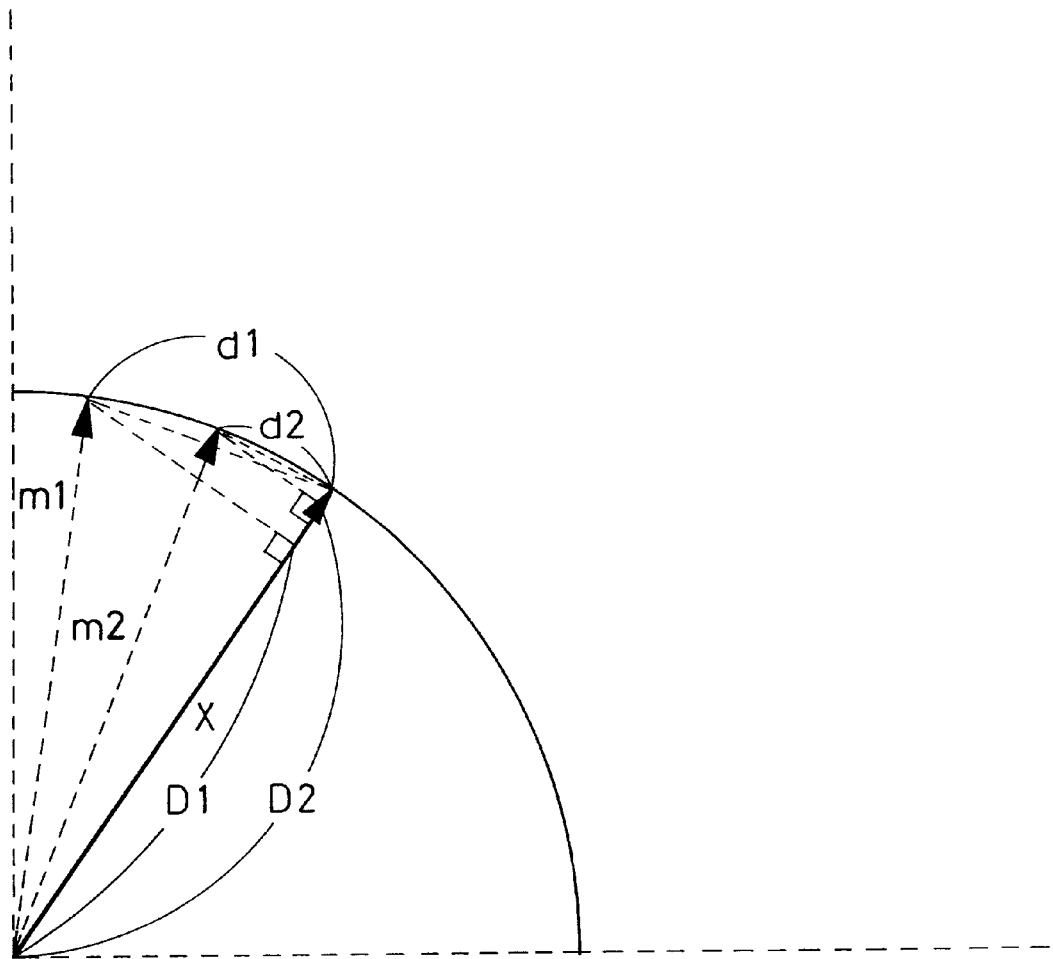
FIG. 5 shows the process of deciding a winner vector in a case where vector data is normalized by $L_2$-norm in the case of FIG. 2.
Figure 6:
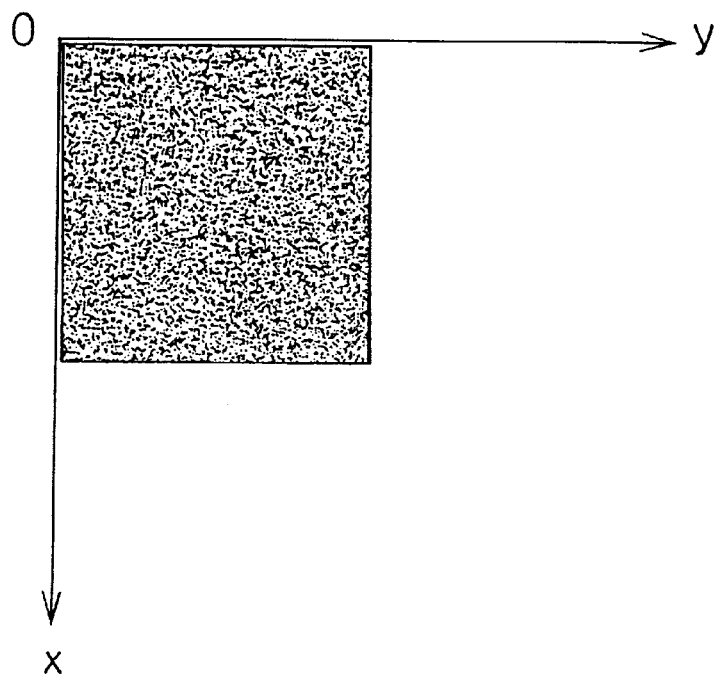
FIG. 6 shows two-dimensional uniformly distributed vector data.
Figure 7:
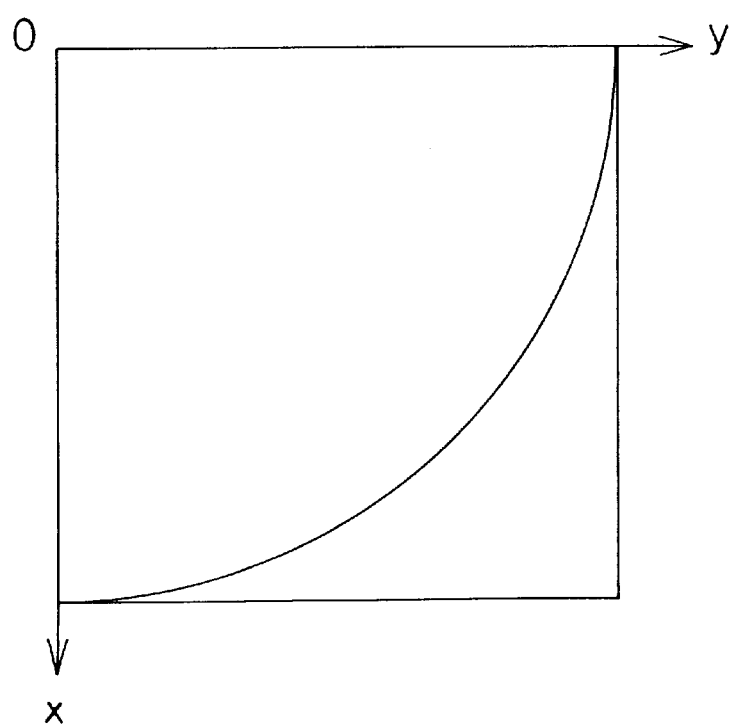
FIG. 7 shows a distribution of input data in a case where two-dimensional uniformly distributed vector data is normalized.
Figure 8:
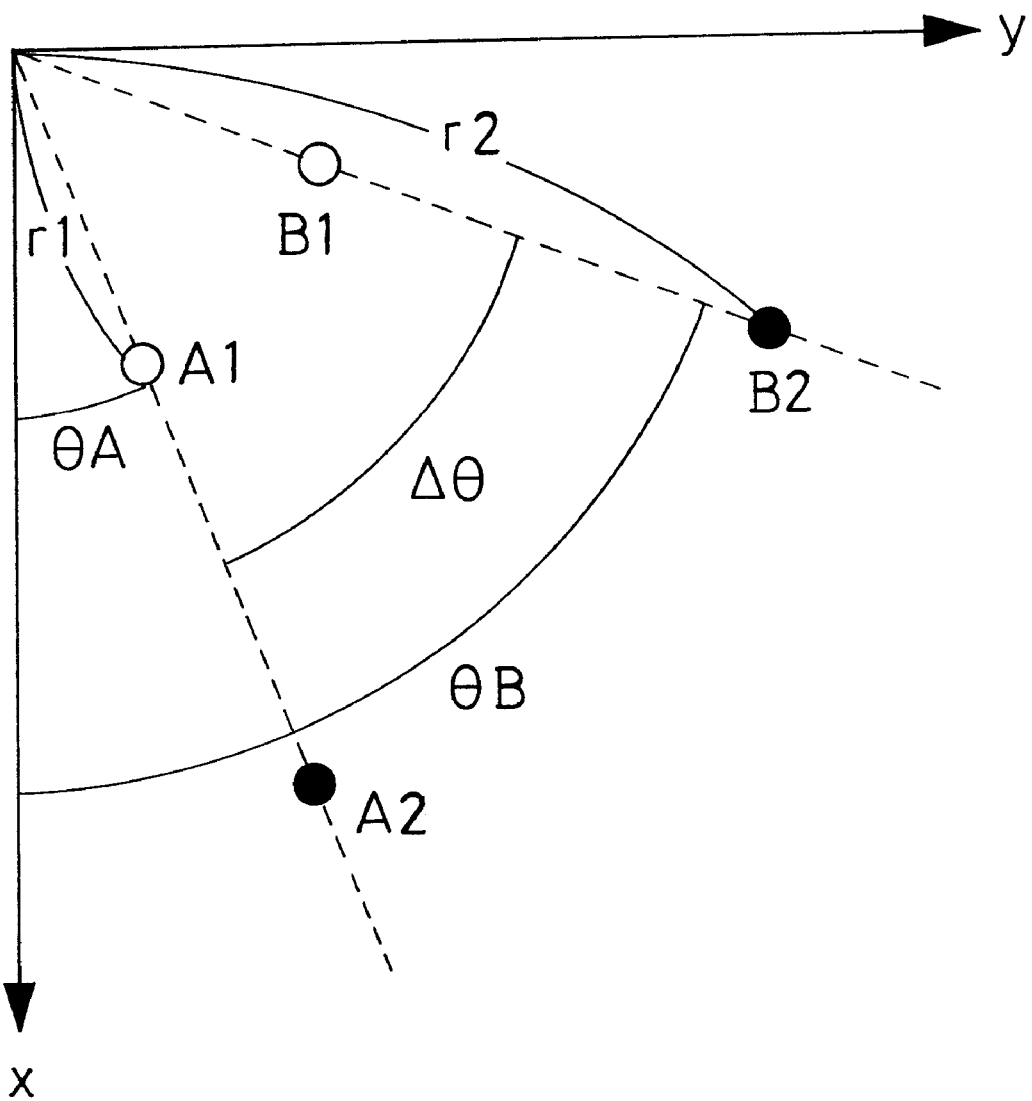
FIG. 8 shows four points in a two-dimensional plane which are entered into an information processing system according to the present invention.
Figure 9:
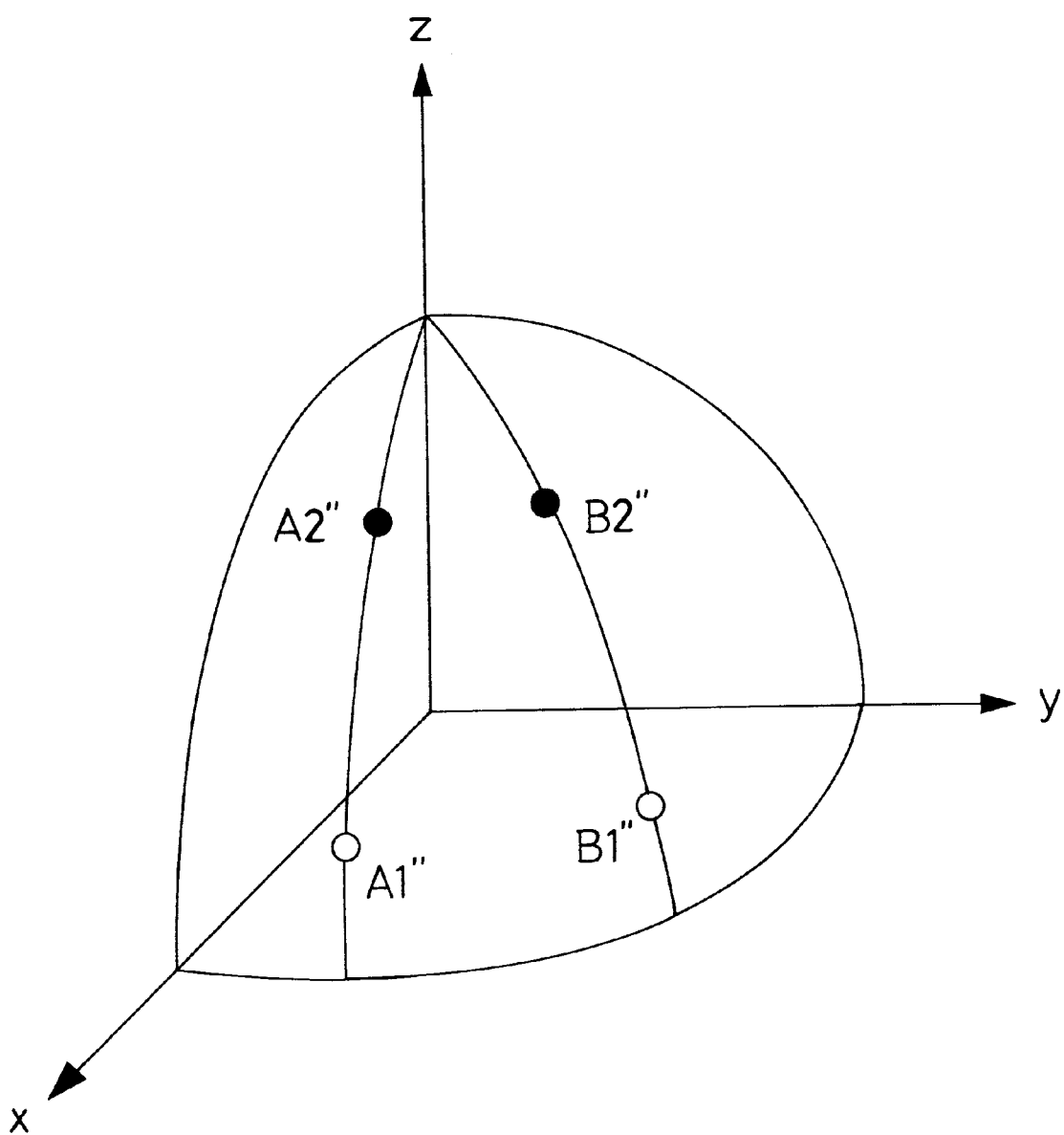
FIG. 9 shows the positions of four points in a three-dimensional space in a case where D is selected as a component indicating norm information.
Figure 10:
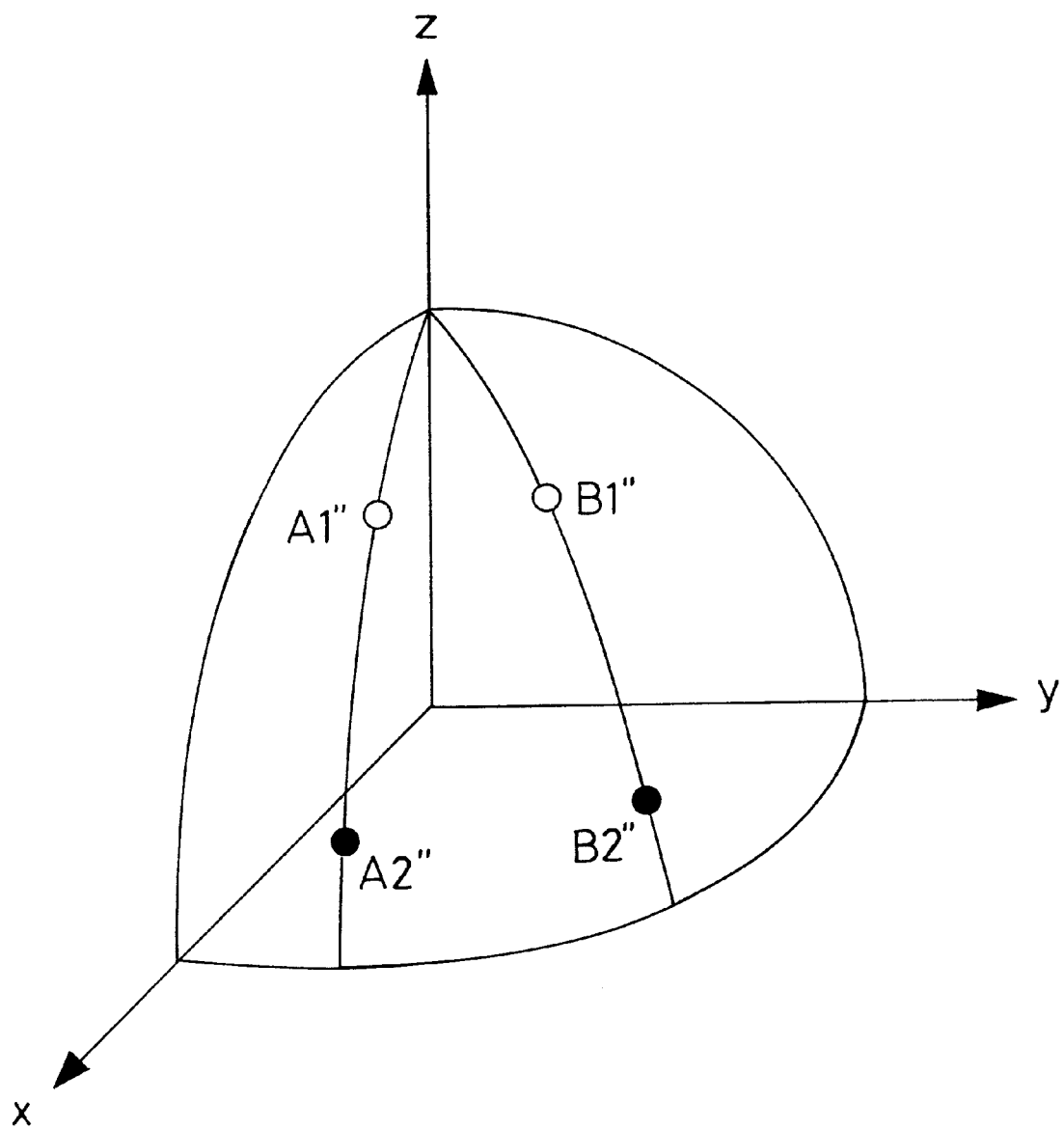
FIG. 10 shows the positions of four points in a three-dimensional space in a case where 1/D is selected as a component indicating norm information.
Figure 11:
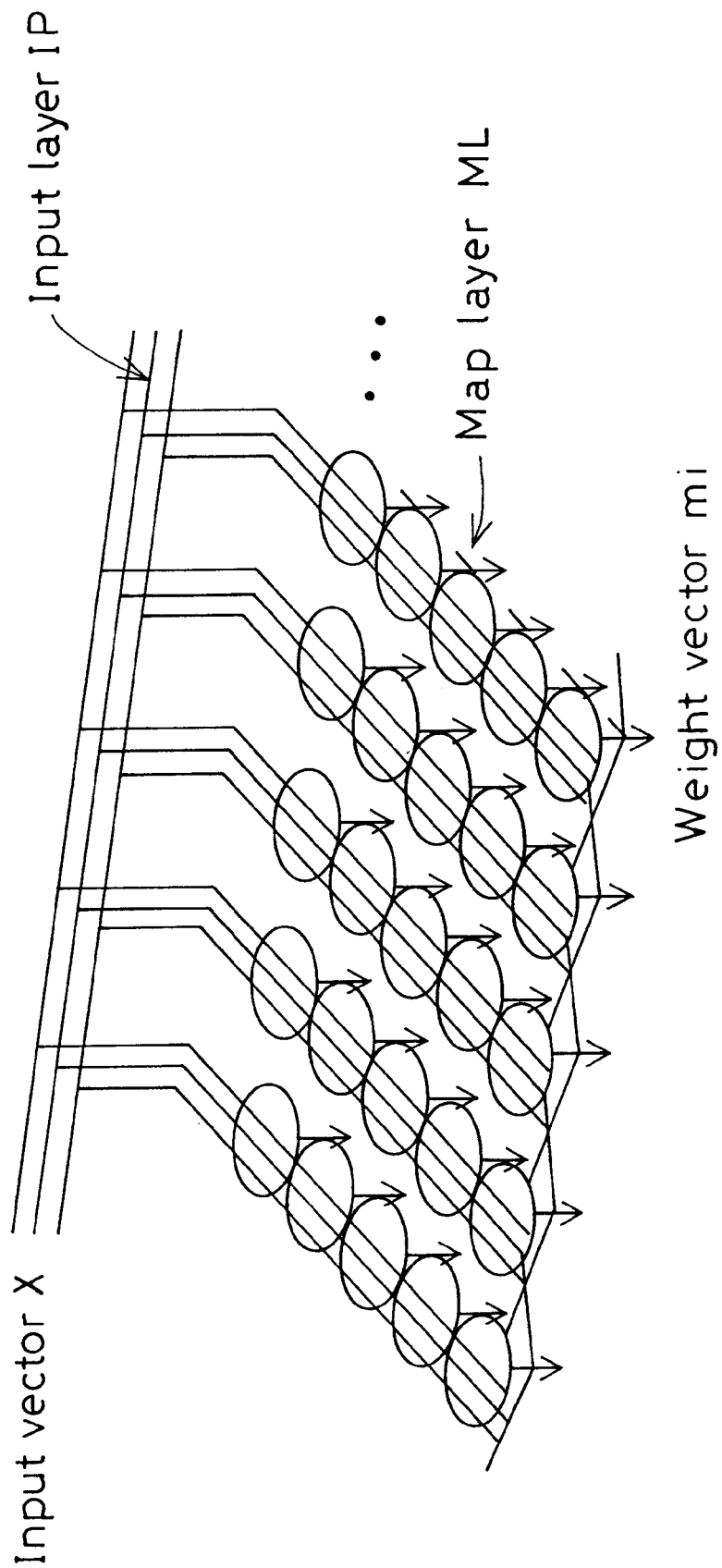
FIG. 11 shows the structure of a self-organizing feature map.
Figure 12A:
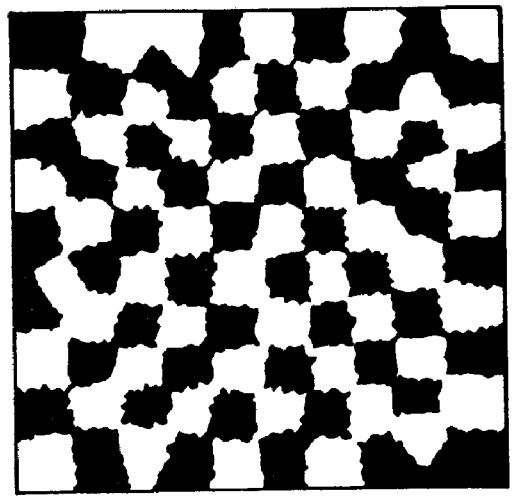
FIG. 12($a$) is a territory map obtained when the Euclidean distance is used as a distance measure for competitive learning.
Figure 12B:
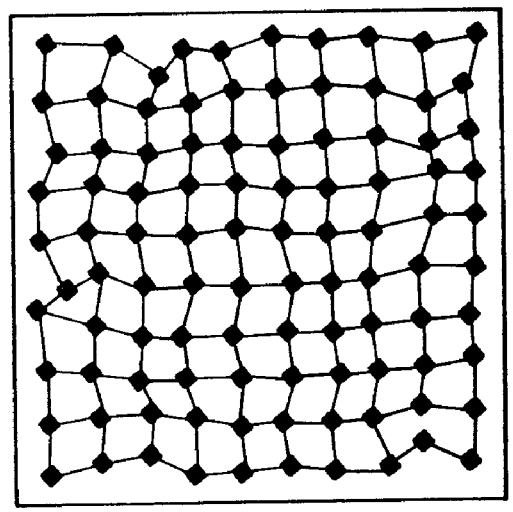
Figure 13A:
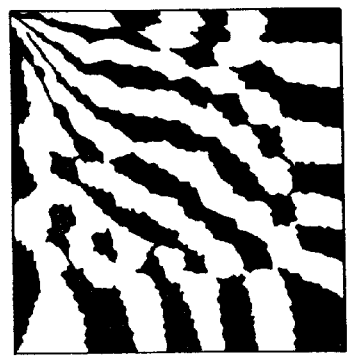
FIGS. 13($a$), 13($b$) and 13($c$) are territory maps obtained when D, 1/D, and equation (13) are selected, respectively, as a component indicating norm information.
Figure 13B:
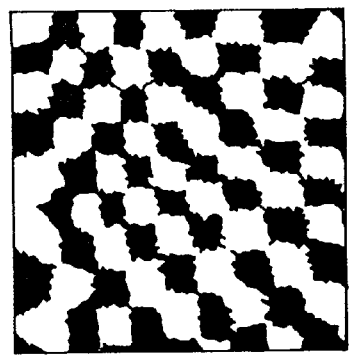
Figure 13C:
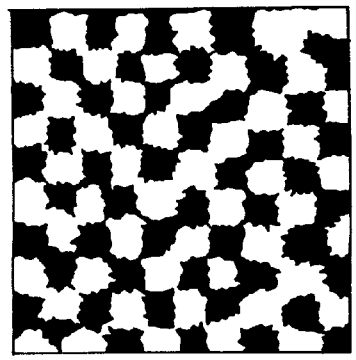
Figure 14:
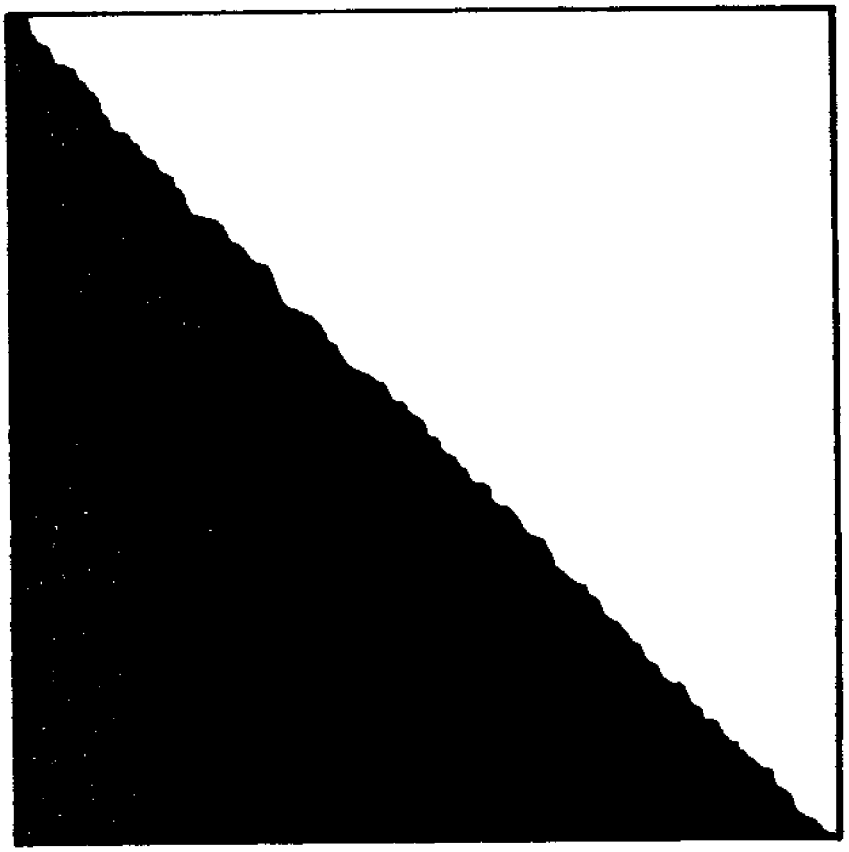
FIG. 14 is a territory map obtained when vector data is normalized by $L_1$-norm without using f(D).
Figure 15:
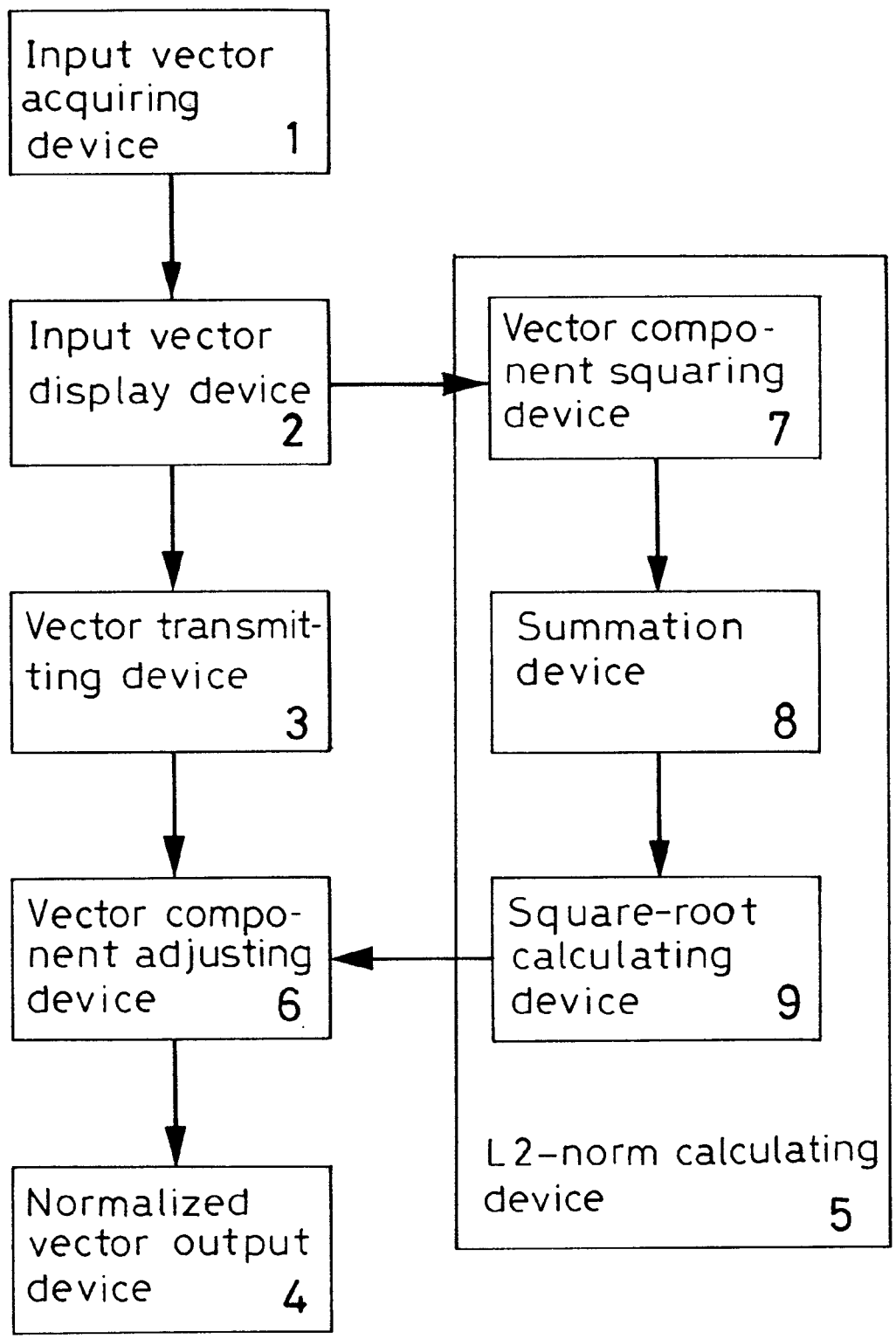
FIG. 15 is a block diagram schematically showing the arrangement of vector normalizing apparatuses according to a first to third embodiments of the present invention.

The input vector normalizing apparatuses are arranged as shown in FIG. 15. An input vector acquiring device 1 acquires vector data to be processed. An input vector display device 2 displays the vector data in the system. A vector transmitting device 3 transmits the input vector data to a normalized vector output device 4 which delivers an output to a competitive learning system (not shown) in a subsequent stage for competitive learning using the inner product. During the transmission of the vector data, an $L_2$-norm calculating device 5 calculates $L_2$-norm of the displayed vector, and a vector component adjusting device 6 normalizes, i.e. divides, the input vector by using the calculated value of $L_2$-norm. Thus, the input vector normalized on the basis of $L_2$-norm is delivered onto the normalized vector output device 4. More specifically, the $L_2$-norm calculating device 5 includes a vector component squaring device 7 for squaring each of the components of the displayed vector; a summation device 8 for calculating a total sum of the squared vector components; and a square-root calculating device 9 for calculating $L_2$-norm by obtaining a square root of the result of the summation.

In the following embodiments, the vector normalizing apparatus is assumed to process an input gray-level or binary image.

[First Embodiment]

Figure 16:
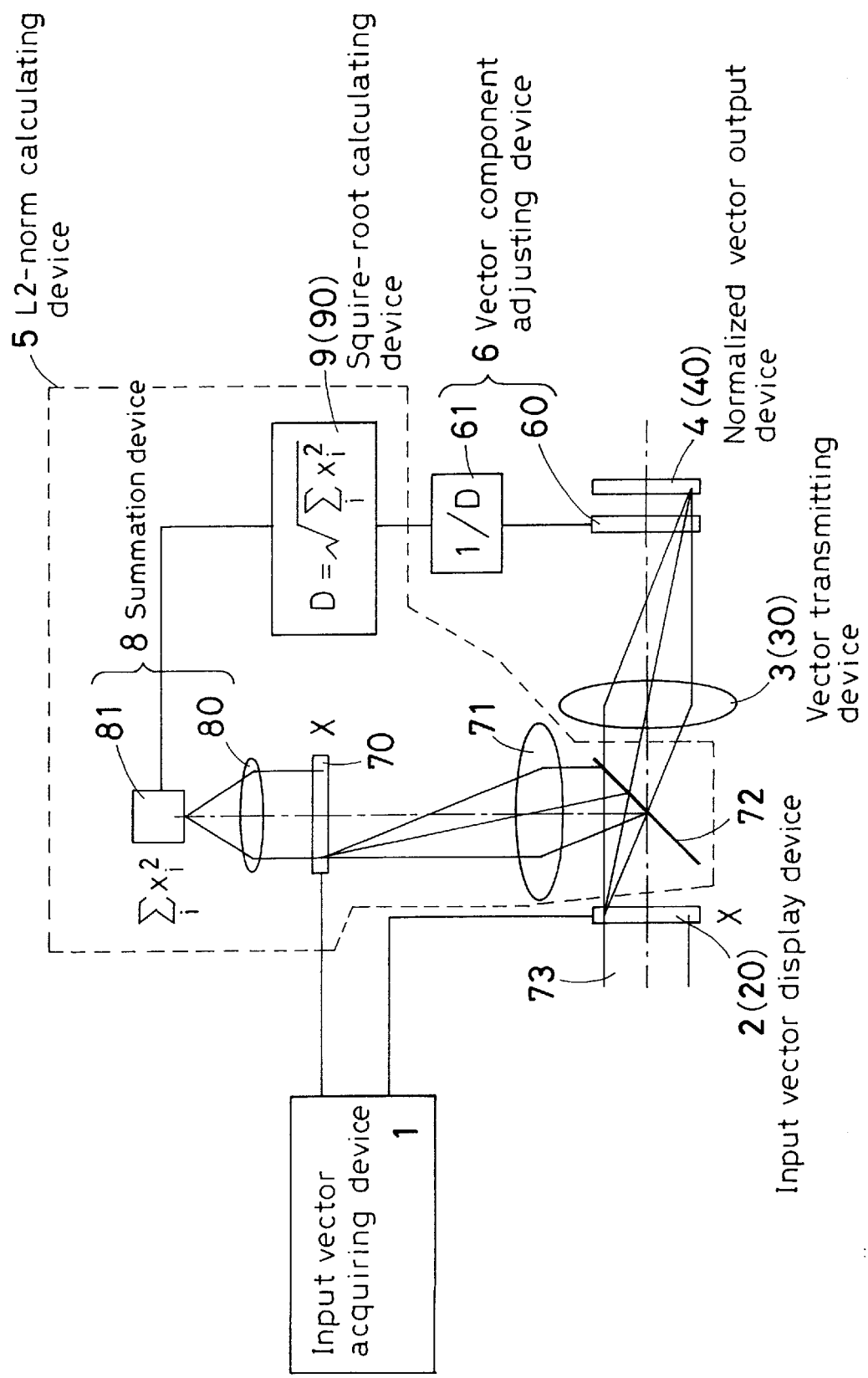
FIG. 16 shows a specific arrangement of the vector normalizing apparatus according to the first embodiment of the present invention.

A vector normalizing apparatus according to this embodiment is shown in FIG. 16. In this embodiment, the input vector acquiring device 1 includes an image pickup device (not shown), e.g. a CCD, for taking an image to be processed, and a frame memory (not shown) for converting the input image into digital data and temporarily storing it. The input vector display device 2 includes a spatial light modulator 20, more specifically, a transmission type, electrically addressed liquid-crystal spatial light modulator, and a combination of a controller and driver (not shown) for driving the spatial light modulator 20 according to information sent from the input vector acquiring device 1. The vector transmitting device 3 is an image-forming lens 30 for placing the spatial light modulator 20 and a spatial light modulator 40 (described later) in image-formation relation to each other. The normalized vector output device 4 includes a spatial light modulator 40, more specifically, a reflection type, optically addressed liquid-crystal spatial light modulator, and a combination of a controller and driver (not shown) for driving the spatial light modulator 40. The vector component adjusting device 6 for performing normalization, i.e. division, includes a reciprocal generating circuit 61, more specifically, an electrical analog circuit using a divider, and a transmittance varying shutter 60, more specifically, a liquid-crystal shutter, which is placed immediately in front of the spatial light modulator 40 as shown in FIG. 16. The vector component adjusting device 6 further includes a combination of a controller and driver (not shown) for driving the transmittance varying shutter 60. The vector component squaring device 7 in the $L_2$-norm calculating device 5 includes a spatial light modulator 70 having the same performance as that of the spatial light modulator used in the input vector display device 2, and a combination of a controller and driver (not shown) for driving the spatial light modulator 70. The vector component squaring device 7 further includes an image-forming lens 71 for placing the spatial light modulators 20 and 70 in image-formation relation to each other as shown in FIG. 16, and a beam splitter 72. The summation device 8 in the $L_2$-norm calculating device 5 includes a condenser lens 80 and a detector 81. The square-root calculating device 9 in the $L_2$-norm calculating device 5 consists essentially of a square-root circuit 90, more specifically, an electrical analog circuit using a multiplier. It should be noted that in this embodiment light beams propagated between the optical elements are incoherent light.

Image information, which is captured by an image pickup device, e.g. a CCD, in the input vector acquiring device 1, is subjected to analog-to-digital conversion to form a vector X in the frame memory. The vector X is sent to the controllers and drivers for the spatial light modulators 20 and 70 and displayed thereon. The vector X on the spatial light modulator 20 is read by an incoherent light beam 73 and superimposed on the vector X on the spatial light modulator 70 by the image-forming lens 71 and the beam splitter 72 such that the corresponding vector components (i.e. the corresponding pixels of the two spatial light modulators) coincide with each other. The superimposed information is proportional to the square of each component of the vector X. The information is condensed through the condenser lens 80 and photoelectrically converted by the detector 81. Consequently, information proportional to the total sum of the squares of the components of the vector X is obtained in the form of a current value. The information is further supplied to the square-root circuit 90 to obtain a square root thereof. Thus, $L_2$-norm, that is, information proportional to the square sum of the vector components, is obtained in the form of a voltage value.

The information proportional to the $L_2$-norm is supplied to the reciprocal generating circuit 61 to form reciprocal information, which is then sent to the controller and driver for the transmittance varying shutter 60 to vary the transmittance of the transmittance varying shutter 60 in inverse proportion to the $L_2$-norm. On the other hand, information concerning the vector X, which is transmitted from the spatial light modulator 20 through the image-forming lens 30, passes through the transmittance varying shutter 60 whose transmittance changes in inverse proportion to the $L_2$-norm, thereby being written onto the spatial light modulator 40 as information exactly proportional to the input vector information normalized by the $L_2$-norm. The information is read from the read side of the spatial light modulator 40 by a light beam (not shown) and sent to a competitive learning system or the like (not shown) in the subsequent stage, which uses the inner product.

It will be clear from the foregoing description that it is possible to perform competitive learning satisfying the condition A-1) by entering the input vector normalized by the above-described apparatus into a competitive learning system or the like.

[Second Embodiment]

Figure 17:
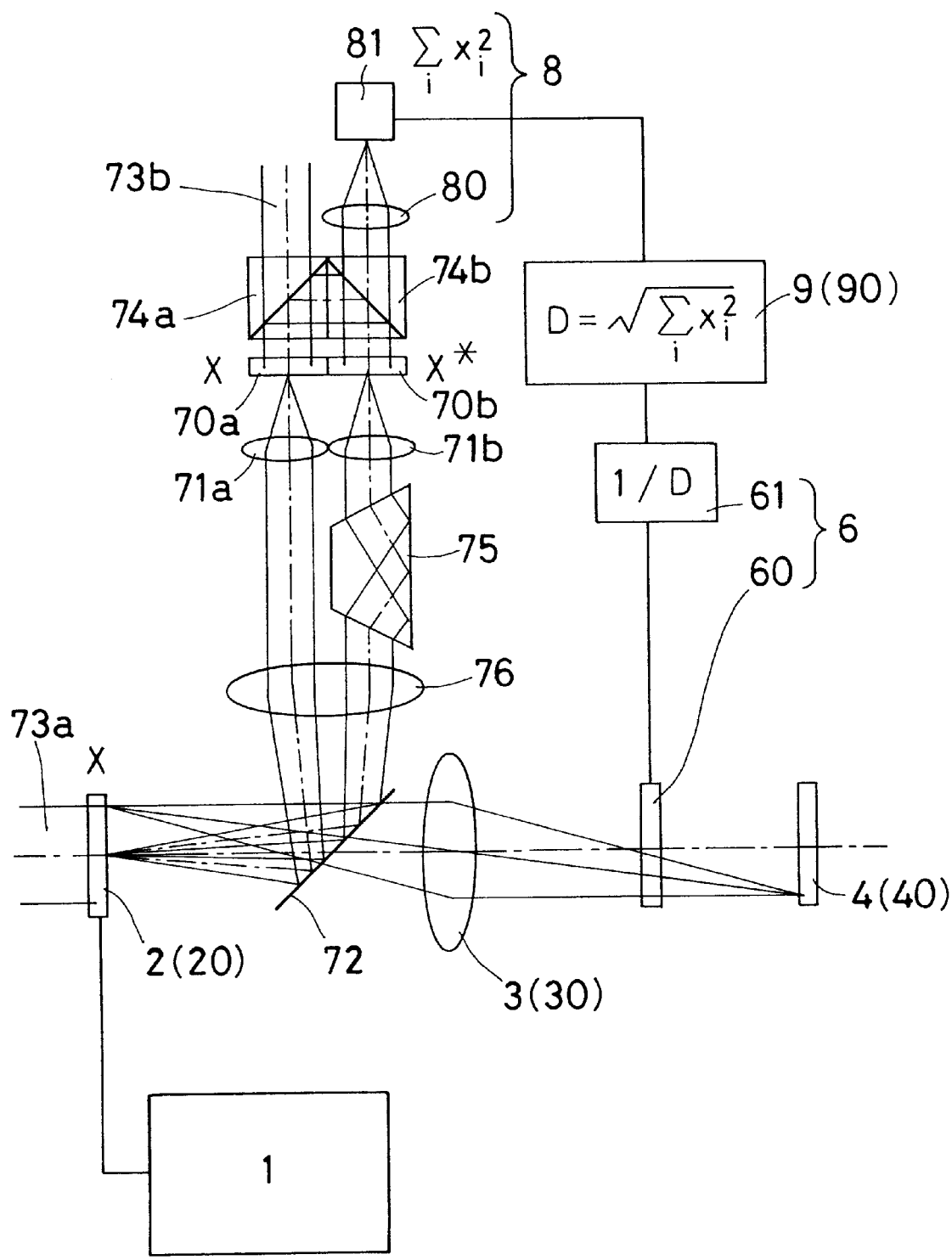
FIG. 17 shows a specific arrangement of the vector normalizing apparatus according to the second embodiment of the present invention.

A vector normalizing apparatus according to this embodiment is shown in FIG. 17. The vector normalizing apparatus according to this embodiment is a modification of the first embodiment, in which the arrangements other than the vector component squaring device 7 in the $L_2$-norm calculating device 5 are the same as those in the first embodiment.

In this embodiment, the vector component squaring device 7 in the $L_2$-norm calculating device 5 includes spatial light modulators 70a and 70b, more specifically, reflection type optically addressed liquid-crystal spatial light modulators having the same performance, and combinations of a controller and driver (not shown) for driving the spatial light modulators 70a and 70b, respectively. The vector component squaring device 7 further includes a multiple image-forming optical system having one large-aperture lens 76 and two small-aperture lenses 71a and 71b, which are disposed in confocal relation to each other, a Dove prism 75, and beam splitters 74a and 74b.

A vector X displayed on the spatial light modulator 20 is read by an incoherent light beam 73a and passed through a multiple image-forming optical system formed from one large-aperture lens 76 and two small-aperture lenses 71a and 71b with a Dove prism 75 inserted in one optical path formed by the large-aperture lens 76 and one of the small-aperture lenses 71a and 71b. Consequently, the light beam passing through the optical path having no Dove prism 75 inserted therein reproduces the same vector X as the displayed one, and the light beam passing through the optical path having the Dove prism 75 inserted therein reproduces a horizontally inverted vector X* (in actuality, there is also inversion in a vertical direction perpendicular to the plane of the figure by real image formation; however, it is not discussed herein because the directions of the two images are the same). These pieces of information are recorded on the two spatial light modulators 70a and 70b, which are disposed at the respective positions of the reproduced images. The recorded pieces of information are sequentially read by using the beam splitters 74a and 74b, which are disposed in close proximity to the spatial light modulators 70a and 70b as shown in FIG. 17. As will be clear from FIG. 17, the information is read out in such a manner that the information recorded on the spatial light modulator 70b is read by using light used to read the information from the spatial light modulator 70a. Therefore, the information thus read out is proportional to the square of each component of the input vector X (in actuality, the information is proportional to the square of each component of X*; however, since X and X* are the same once light is collected, the information is herein intentionally expressed as proportional to the square of each component of X in order to avoid confusion). If the Dove prism 75 is not used, the two pieces of information are superimposed as they are horizontally inverted, and the corresponding vector components do not coincide with each other. It will be clear that if the information is further processed in the same way as in the first embodiment, input vector information normalized by $L_2$-norm is finally obtained on the spatial light modulator 40 as in the case of the first embodiment. Further, it will be clear from the foregoing description that it is possible to perform competitive learning satisfying the condition A-1) by reading the normalized information with a light beam (not shown) and sending the readout information to a competitive learning system or the like (not shown) in the subsequent stage, which uses the inner product.

Figure 18:
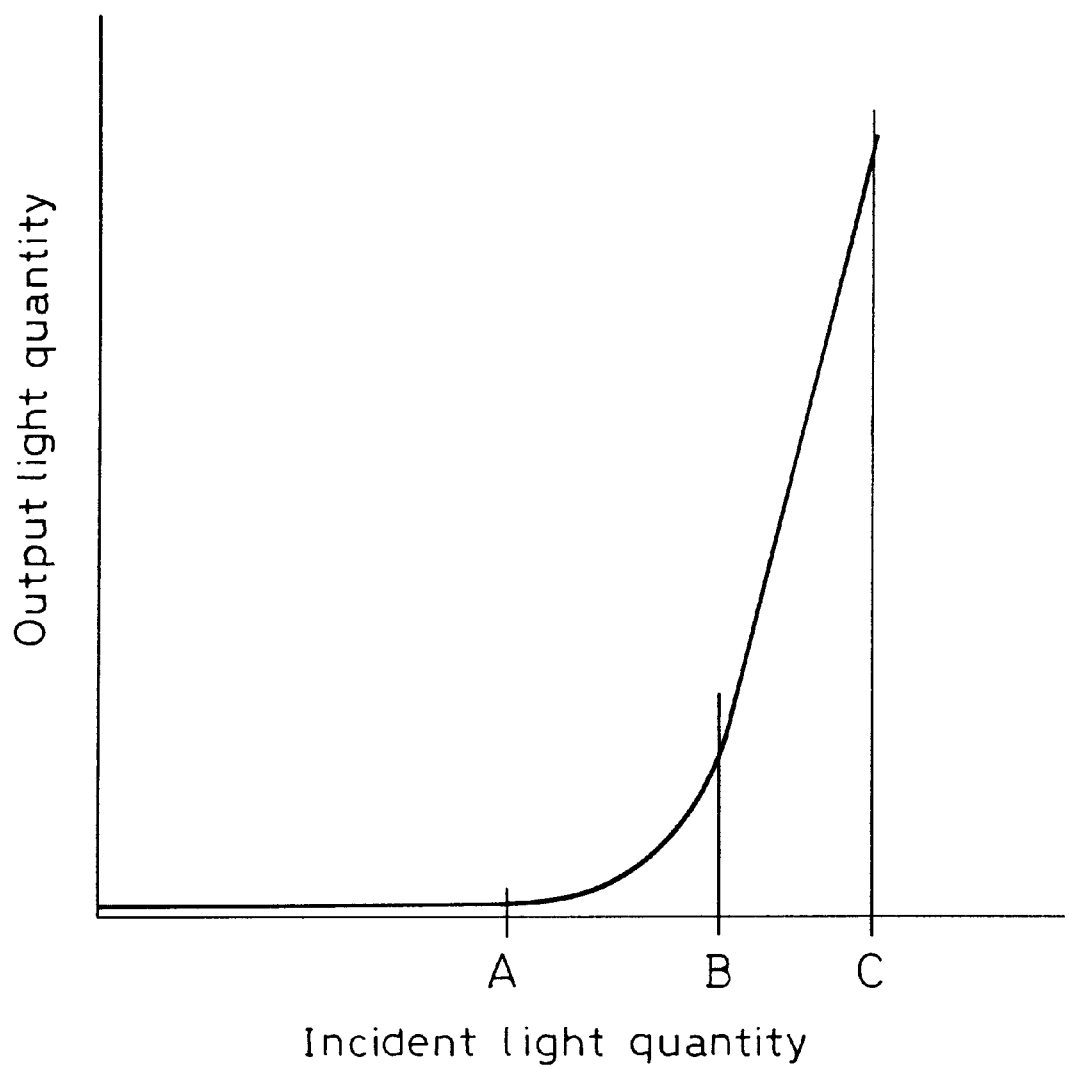
FIG. 18 is a graph for describing the incident light quantity-output light quantity characteristics of spatial light modulators.

It should be noted that optically addressed spatial light modulators generally have non-linear output light quantity characteristics with respect to the incident light quantity (the applied voltage in the case of electrically addressed spatial light modulators), as shown in FIG. 18; therefore, in this embodiment a linear portion (between B and C in the figure) of the characteristics curve is used. Regarding the spatial light modulator 20 also, if the input-output light quantity characteristics including the non-linear portion are used, it is equivalent to performing contrast enhancement on the input vector. In such a case also, the apparatus according to this embodiment enables the contrast-enhanced input vector to be normalized by $L_2$-norm.

It should be noted that the multiple image-forming optical system may also be formed by using other optical elements capable of reproducing the vector X, e.g. a diffraction optical element or a prism array. The two spatial light modulators 70a and 70b need not always be two discrete members but may be formed from two divided regions, respectively, of a single optically addressed liquid-crystal spatial light modulator or the like.

[Third Embodiment]

Figure 19:
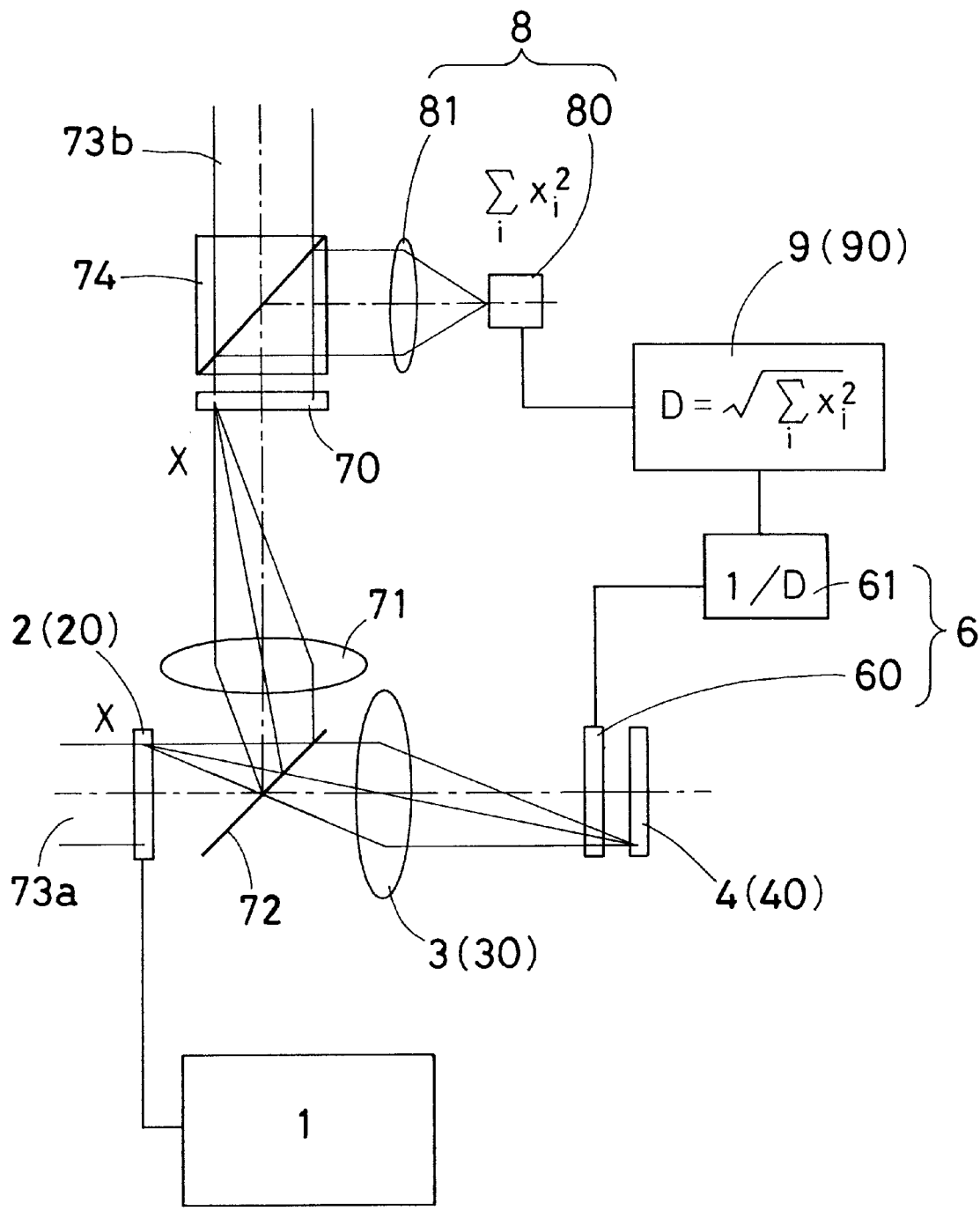
FIG. 19 shows a specific arrangement of the vector normalizing apparatus according to the third embodiment of the present invention.

A vector normalizing apparatus according to this embodiment is shown in FIG. 19. The vector normalizing apparatus according to this embodiment is a modification of the second embodiment. That is, the vector component squaring device 7 in the $L_2$-norm calculating device 5 uses an optically addressed spatial light modulator designed to use that portion of the incident light quantity-output light quantity characteristics which is capable of square approximation (i.e. the portion between A and B in FIG. 18), and the arrangement of that portion of the vector component squaring device 7 is modified correspondingly.

In this embodiment, the vector component squaring device 7 in the $L_2$-norm calculating device 5 includes the above-described reflection type optically addressed liquid-crystal spatial light modulator as the spatial light modulator 70; a combination of a controller and driver (not shown) for driving the spatial light modulator 70; an image-forming lens 71 for placing the spatial light modulators 20 and 70 in image-formation relation to each other as shown in the figure; a beam splitter 72; and a beam splitter 74 for reading information from the spatial light modulator 70.

A vector X displayed on the spatial light modulator 20 is read by an incoherent light beam 73a and written onto the spatial light modulator 70 by the image-forming lens 71 and the beam splitter 72. The spatial light modulator 70 uses that portion of the input-output characteristics which is capable of square approximation, as stated above. Therefore, information read out of the spatial light modulator 70 by an incoherent light beam 73b through the beam splitter 74 is proportional to the square of each component of the input vector X. It will be clear that if the information is further processed in the same way as in the first embodiment, input vector information normalized by $L_2$-norm is finally obtained on the spatial light modulator 40 as in the case of the first embodiment. Further, it will be clear from the foregoing description that it is possible to perform competitive learning satisfying the condition A-1) by reading the normalized information with a light beam (not shown) and sending the readout information to a competitive learning system or the like (not shown) in the subsequent stage, which uses the inner product. In this embodiment also, if the input-output light quantity characteristics including the non-linear portion are used for the spatial light modulator 20, it is equivalent to performing contrast enhancement on the input vector. In such a case also, the apparatus according to this embodiment enables the contrast-enhanced input vector to be normalized by $L_2$-norm.

[Fourth Embodiment]

Figure 20:
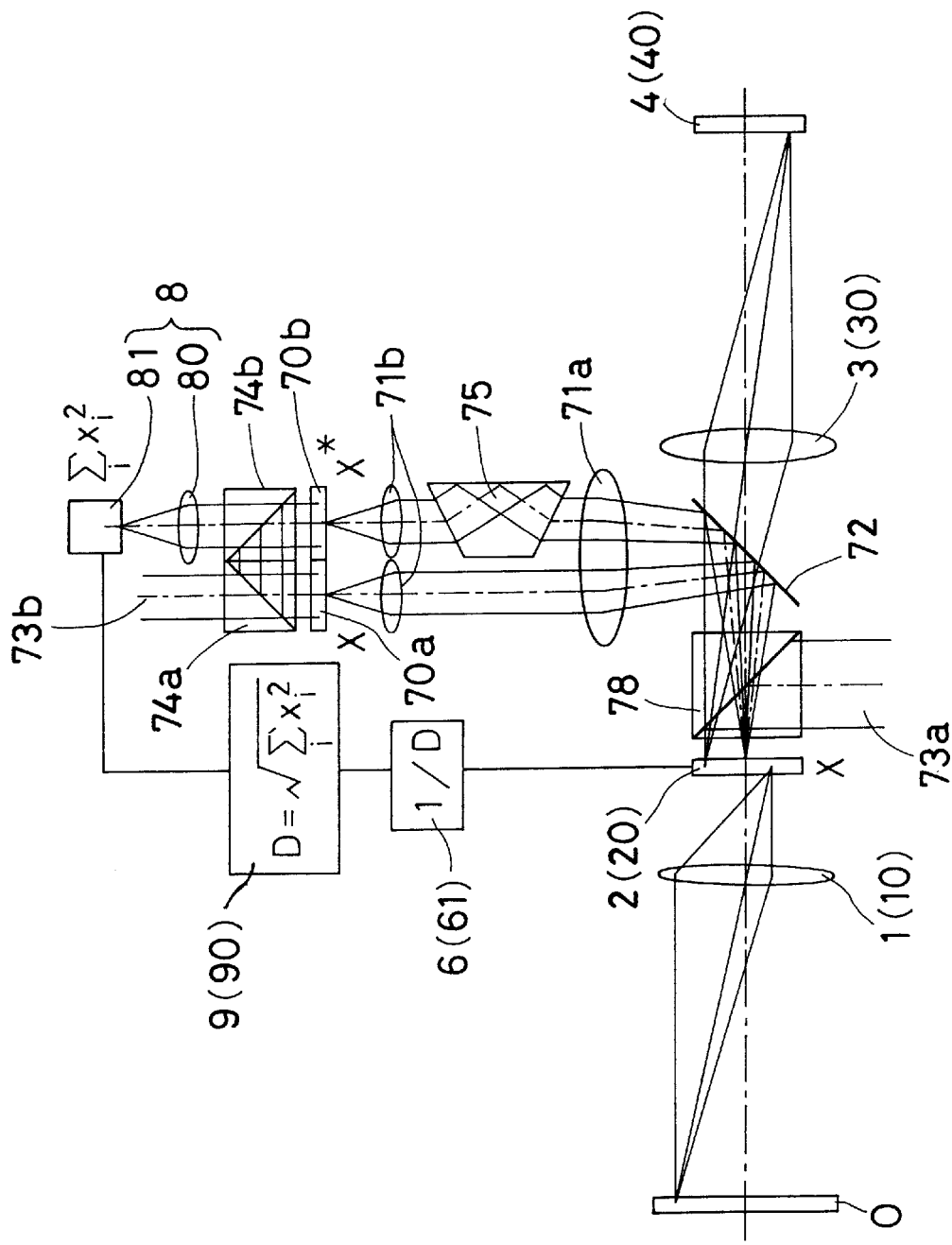
FIG. 20 shows a specific arrangement of the vector normalizing apparatus according to a fourth embodiment of the present invention.
Figure 21:
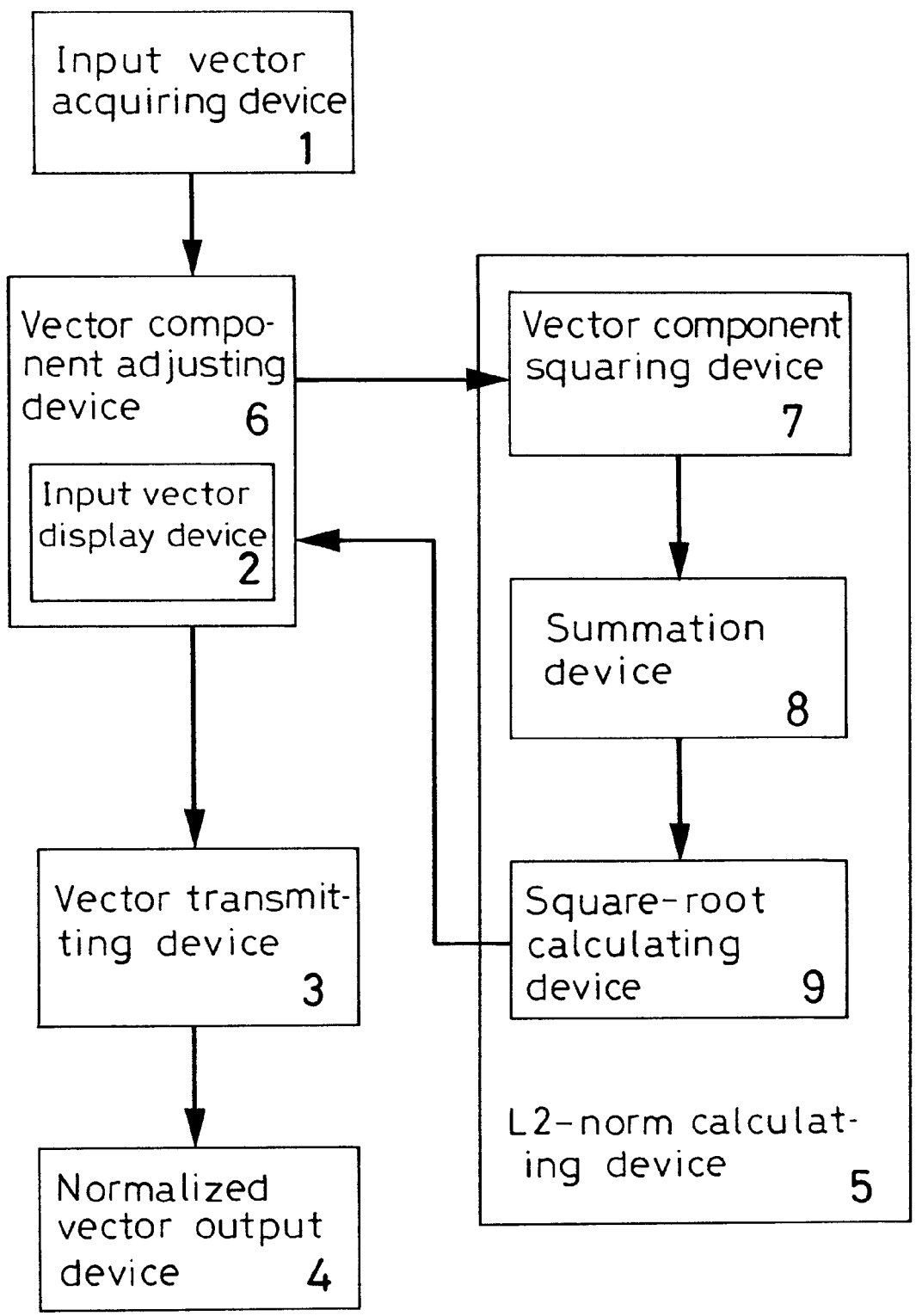
FIG. 21 is a block diagram schematically showing the arrangement of the vector normalizing apparatus according to the fourth embodiment of the present invention.

A vector normalizing apparatus according to this embodiment is shown in FIG. 20. The vector normalizing apparatus according to this embodiment is a modification of the second embodiment. In this embodiment, to enter an input vector directly, the input vector display device 2 uses a reflection type optically addressed spatial light modulator 20, more specifically, a reflection type optically addressed liquid-crystal spatial light modulator, and the input vector acquiring device 1 uses an image-forming lens 10 to image an object O directly on the spatial light modulator 20, thereby entering the object image into the system. Consequently, the arrangement of the vector transmitting device 3 is modified such that a beam splitter 78 is added to the vector transmitting device 3 to read the input vector by reflected light. Moreover, no transmittance varying shutter is used as a constituent element of the vector component adjusting device 6. Instead, information concerning the reciprocal of $L_2$-norm calculated by the reciprocal generating circuit 61 is sent to a controller (not shown) for the spatial light modulator 20 to change the driving voltage applied to the controller, thereby normalizing the input vector on the spatial light modulator 20. All the other constituent parts are the same as those of the second embodiment. FIG. 21 is a block diagram of this embodiment, which corresponds to FIG. 15. The arrangement shown in FIG. 21 differs from that shown in FIG. 15 in that the vector component adjusting device 6 is disposed in the stage subsequent to the input vector acquiring device 1, and the vector component adjusting device 6 serves also as the input vector display device 2, and that the value of $L_2$-norm calculated by the $L_2$-norm calculating device 5 is entered into the input vector display device 2.

Vector information X concerning the object O to be processed is written directly onto the reflection type optically addressed spatial light modulator 20 of the input vector display device 2 through the image-forming lens 10 of the input vector acquiring device 1. The input vector information X is read with reflected light by illuminating the spatial light modulator 20 with an incoherent light beam 73a through the beam splitter 78 of the vector transmitting device 3. Thereafter, the readout information is supplied to a vector component squaring device 7 which is arranged as in the case of the second embodiment. Thus, each component of the vector information is squared by each element of the vector component squaring device 7. Further, the vector information is passed through a summation device 8 and a square-root calculating device 9, which are similar to those in the second embodiment, thereby obtaining information proportional to the $L_2$-norm. The information proportional to the $L_2$-norm is supplied to the reciprocal generating circuit 61 of the vector component adjusting device 6 to obtain reciprocal information. Further, the reciprocal information is sent to the controller (not shown) for the spatial light modulator 20 to change the driving voltage applied to the spatial light modulator 20 through a driver (not shown), thereby performing normalization based on the $L_2$-norm on the spatial light modulator 20. More specifically, when the $L_2$-norm is large, the driving voltage applied to the spatial light modulator 20 is lowered, whereas, when the $L_2$-norm is small, the driving voltage applied to the spatial light modulator 20 is raised. By doing so, the vector information read from the spatial light modulator 20 can be normalized by the $L_2$-norm. Information concerning the vector X normalized by the $L_2$-norm is transmitted through the image-forming lens 30 of the vector transmitting device 3 and written onto the spatial light modulator 40. The information on the spatial light modulator 40 is read by a light beam (not shown) and sent to a competitive learning system or the like (not shown) in the subsequent stage, which uses the inner product.

It will be clear from the foregoing description that it is possible to perform competitive learning satisfying the condition A-1) by using the input vector normalized by the above-described apparatus.

It should be noted that the arrangement of each of the foregoing embodiments may be modified in a variety of ways. Although in the foregoing embodiments the input vector acquiring device uses an image pickup device, e.g. a CCD, to enter vector information, or directly images it because input vector information is assumed to be an image, other devices may be used to acquire input vector information. For example, in the case of voice, a microphone and an AD converter may be used; for a density, a density sensor may be used; and for a flow rate, a flow sensor or the like may be used. Basically, it is only necessary to acquire desired information with a sensor and to enable the information obtained with the sensor to be taken into the system. Further, various other vector acquiring devices may be used. For example, information captured by other equipment (e.g. a medical image captured by a CT apparatus, an MRI apparatus or the like, or a three-dimensional image captured by a shape measuring apparatus) may be entered through an Ethernet or the like. Such information may be processed after being subjected to feature extraction.

Although specific examples of spatial light modulators used in the foregoing embodiments are all liquid-crystal spatial light modulators, it is also possible to use other types of spatial light modulator, e.g. spatial light modulators made of crystal, which utilize electro-optical effect or magneto-optical effect; spatial light modulators made of an organic compound; spatial light modulators that utilize an organism such as bacteriorhodopsin; or spatial light modulators that utilize mechanical deformation such as a deformable mirror.

Although in the foregoing embodiments an electrical analog circuit using a divider is used to constitute the reciprocal generating circuit 61 and an electrical analog circuit using a multiplier is used as the square-root circuit 90, it is also possible to use an analog circuit having an arithmetic unit capable of simultaneously executing these arithmetic operations, or other analog or digital circuits.

In a case where the number of vectors handled is small, all the calculation of $L_2$-norm may be performed by an electrical circuit or processed by software. In such a case also, a certain level of processing speed can be attained.

Although incoherent light is used as light beams in the foregoing embodiments, coherent light may be used for optically addressed spatial light modulators. However, for electrically addressed spatial light modulators, it is desirable to use incoherent light with a view to avoiding diffraction patterns of pixels.

As has been stated above, the vector normalizing apparatuses according to the first to fourth embodiments are effectively used to normalize not only input vectors but also weight vectors or the like in a competitive learning system or the like that uses the inner product.

Next, an embodiment of a vector normalizing apparatus according to the present invention will be described which realizes an algorithm wherein norm information f(D) for preserving topology is generated by using $L_2$-norm calculated from an input vector and added to the input vector, and $L_2$-norm is further calculated from the vector having the norm information for preserving topology added thereto to normalize the vector, in order to satisfy the condition A-2) <norm information is added to an input vector before it is normalized> in addition to the condition A-1). It should be noted that, in this embodiment, norm information f(D) for preserving topology is added to an input vector after it has been normalized by using $L_2$-norm calculated from the input vector.

Figure 22:
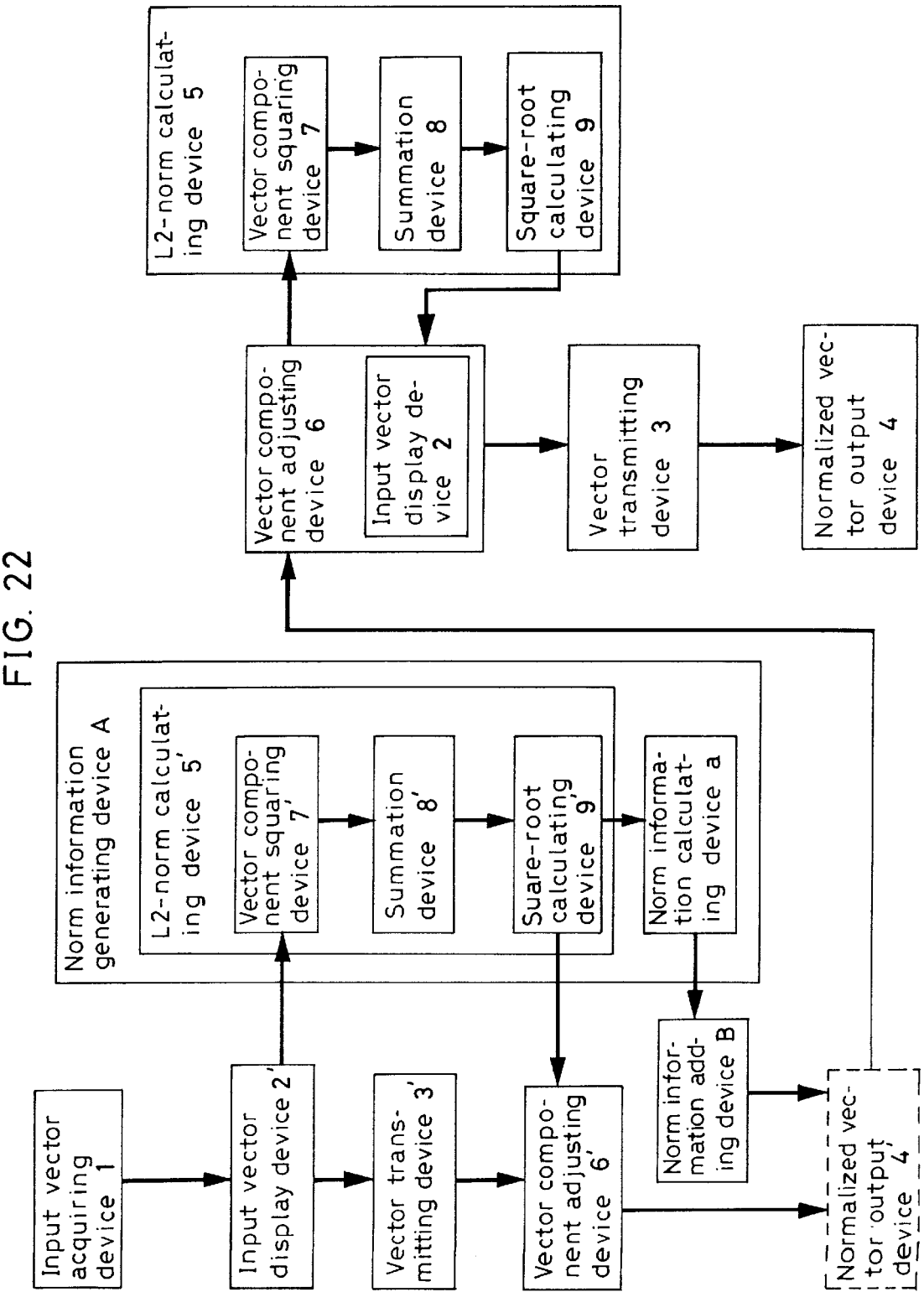
FIG. 22 is a block diagram schematically showing the arrangement of the vector normalizing apparatus according to a fifth embodiment of the present invention.

As shown in FIG. 22, this embodiment has a first vector normalizing apparatus arranged in the same way as the vector normalizing apparatus shown in FIG. 21, and a second vector normalizing apparatus inserted between the input vector acquiring device 1 and input vector display device 2 of the first vector normalizing apparatus (for distinctive purposes, apostrophe (') is added to the reference numeral of each constituent element of the second vector normalizing apparatus inserted in the first vector normalizing apparatus). In the second vector normalizing apparatus, an input vector acquiring device is omitted, and the normalized vector output device 4' of the second vector normalizing apparatus and the input vector display device 2 of the first vector normalizing apparatus are formed from a device common to the two apparatuses. The second vector normalizing apparatus is additionally provided with a norm information calculating device a and a norm information adding device B, thereby enabling norm information f(D) for preserving topology to be generated and added by the norm information generating device A, which includes the $L_2$-norm calculating device 5' and the norm information calculating device a, and the norm information adding device B of the second vector normalizing apparatus.

[Fifth Embodiment]

Figure 23:
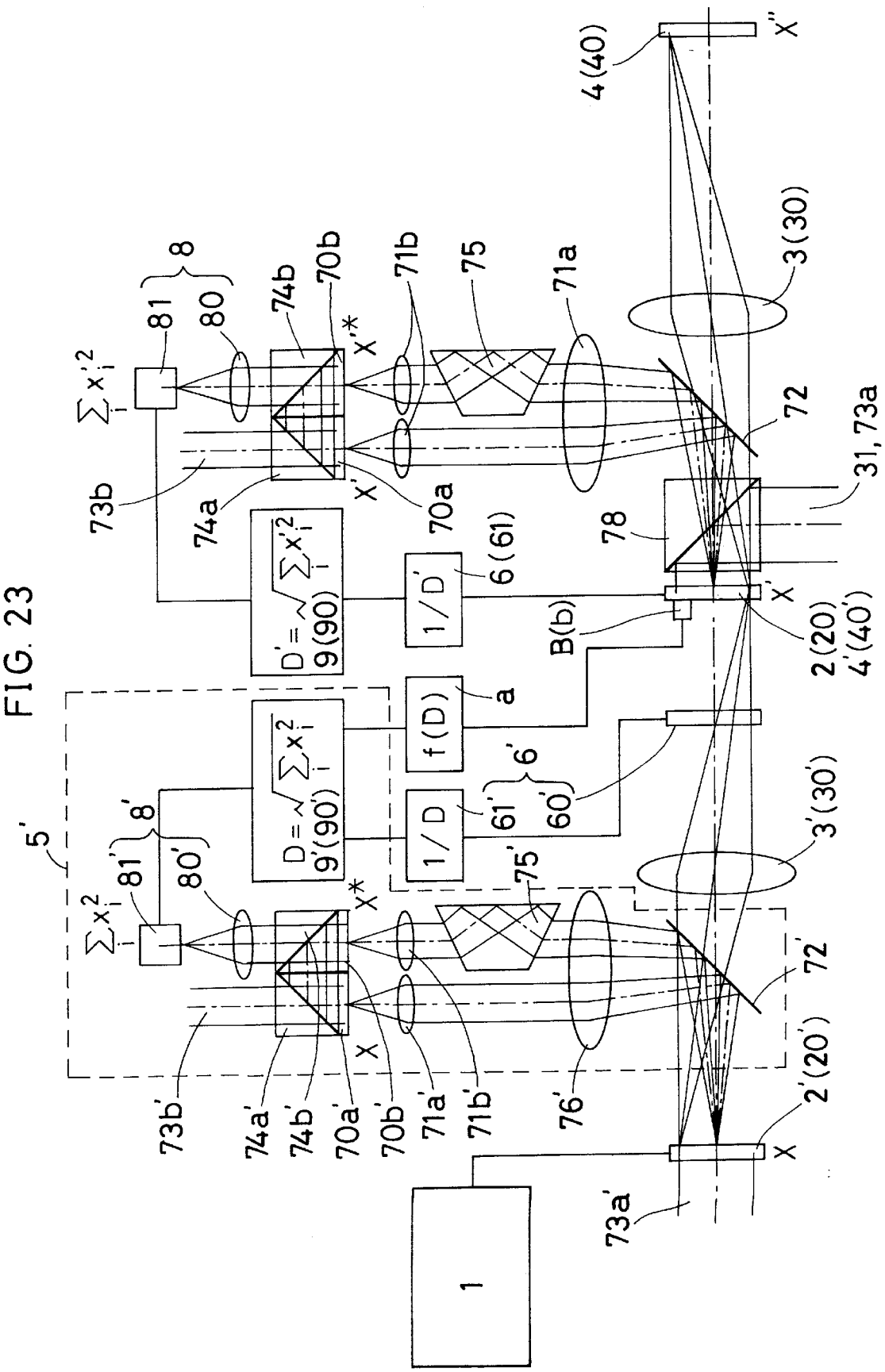
FIG. 23 shows a specific arrangement of the vector normalizing apparatus according to the fifth embodiment of the present invention.

In this embodiment, a first vector normalizing apparatus has an input vector acquiring device 1 arranged as follows: As shown in FIG. 23, the input vector acquiring device 1 of the apparatus shown in FIG. 20, which has been described in the fourth embodiment, is changed to the input vector acquiring device 1 used in the first to third embodiments, which includes an image pickup device (not shown), e.g. a CCD, for taking an image to be processed, and a frame memory (not shown) for converting the input image into digital data and temporarily storing it. A second vector normalizing apparatus having the same arrangement as that of the second embodiment shown in FIG. 17 is inserted between the input vector acquiring device 1 and input vector display device 2 of the first vector normalizing apparatus. In the second vector normalizing apparatus, an input vector acquiring device is omitted, and the normalized vector output device 4' of the second vector normalizing apparatus and the input vector display device 2 of the first vector normalizing apparatus are formed from a device common to the two apparatuses. The second vector normalizing apparatus is additionally provided with a norm information calculating device a and a norm information adding device B, thereby enabling norm information f(D) for preserving topology to be generated and added by the norm information generating device A, which includes the $L_2$-norm calculating device 5' and the norm information calculating device a, and the norm information adding device B of the second vector normalizing apparatus.

The vector normalizing apparatus according to this embodiment realizes the following algorithm: First, an input vector X is normalized by using the second vector normalizing apparatus, and norm information f(D) for preserving topology is generated by the norm information calculating device a using the $L_2$-norm D (Eq.(1)) of the input vector calculated by the $L_2$-norm calculating device 5' of the second vector normalizing apparatus. The norm information f(D) is added to the normalized information of the input vector to generate a vector (X' expressed by Eq.(a)) by the norm information adding device B. Further, the vector having the norm information added thereto is entered into the input vector display device 2 of the first vector normalizing apparatus and normalized (X" expressed by Eq.(3)) by $L_2$-norm calculated from the entered vector by the $L_2$-norm calculating device 5 and the vector component adjusting device 6. By this algorithm, it is possible to satisfy both the condition A-1) <an input vector or a group of weight vectors is normalized by $L_2$-norm to perform competitive learning using the inner product as a distance measure with a degree of accuracy substantially equal to that in a case where the Euclidean distance is used as a distance measure> and the condition A-2) <norm information is added to an input vector before it is normalized>. As has been stated above, the normalized vector output device 4' of the second vector normalizing apparatus and the input vector display device 2 of the first vector normalizing apparatus are formed from a common spatial light modulator 20 (40').

More specifically, the second vector normalizing apparatus is additionally provided with a norm information adding device B including a norm information calculating device a formed from an electrical analog circuit for generating norm information f(D) (in this embodiment, it is formed from a divider consisting essentially of a reciprocal generating circuit similar to the reciprocal generating circuit 61' because f(D) is a decreasing function), and a light-emitting device b whose luminous intensity changes in proportion to the norm information f(D) (more specifically, a combination of an LED and a driving circuit therefor). A light-emitting diode, which serves as the light-emitting device b of the norm information adding device B, is disposed in close proximity to a small area of the address-side surface of the spatial light modulator 20 (40'). The position of a part of the normalized input vector is assigned to the position of the light-emitting diode. FIG. 24(*a*) is a side view of one example of the spatial light modulator 20 (40') provided with the light-emitting device b, and FIG. 24(*b*) is a front view of the spatial light modulator 20 (40'). The spatial light modulator 20 (40') has, for example, 8×8 areas set thereon. For example, a light-emitting diode LED as the light-emitting device b and a lens CL for condensing light from the LED are used to apply an amount of light proportional to the norm information f(D) to one of the areas of the spatial light modulator 20 (40') (the area in the top left corner in the figure). As a result, the normalized vector components are displayed in 63 (8×8−1) areas, and the norm information f(D) is displayed in the remaining area.

The operation of the vector normalizing apparatus according to this embodiment is the same as those of the second and fourth embodiments except the part comprising the norm information calculating device a and the norm information adding device B. Therefore, a detailed description of the operation of this embodiment is omitted. However, it will be clear from the foregoing description that it is possible to perform competitive learning satisfying the conditions A-1) and A-2) by using the input vector X" normalized and additionally provided with norm information by the above-described apparatus in a competitive learning system that uses the inner product.

It should be noted that various other modifications and combinations are conceivable in regard to the arrangement according to this embodiment. For example, an arrangement such as that shown in FIG. 15 (the first to third embodiments) may be used as the first vector normalizing apparatus. In such a case also, similar advantageous effects can be obtained. An arrangement such as that shown in the first, third or fourth embodiment may be used as the second vector normalizing apparatus. In such a case also, similar advantageous effects can be obtained. Thus, the vector normalizing apparatuses according to the foregoing embodiments may be combined as desired.

Regarding the light-emitting device b of the norm information adding device B, if necessary, a lens may be interposed between the light-emitting device b and the spatial light modulator 20 (40') as shown in FIG. 24(*a*) to control a light beam emitted from the light-emitting device b. Alternatively, a diffusing plate may be interposed therebetween to enhance the uniformity of the light beam. It is a matter of course that the light-emitting device b may be disposed to directly face the spatial light modulator 20 (40'). Although in the foregoing embodiment, an additional part is assigned to a part of the spatial light modulator 20 (40') at the sacrifice of a part of the input vector, an area for the additional part may be newly added.

Although in this embodiment the norm information calculating device a is arranged to perform f(D)=1/D, which is a simple decreasing function, for the purpose of simplifying the circuit configuration, the norm information calculating device a may be arranged to perform the function represented by Eq.(13). In such a case, the norm information calculating device a can be constructed of other analog or digital circuits. In a case where the number of vectors handled is small, the calculation of norm information may be processed by software. In such a case also, a certain level of processing speed can be attained.

As has been stated above, the vector normalizing apparatus according to this embodiment is effectively used to normalize not only input vectors but also weight vectors or the like in a competitive learning system or the like that uses the inner product.

The calculation of norm information may be performed such that not $L_2$-norm but $L_1$-norm is calculated by a conventional apparatus, and norm information for preserving topology is generated on the basis of the calculated $L_1$-norm and added to the vector information as in the case of the described embodiment. By this method also, it is possible to provide similar advantageous effects to a certain extent.

It is also possible to produce similar advantageous effects by normalizing an input vector having norm information added thereto without being normalized, provided that g(D)=Df(D) is set.

As has been described above, the present invention makes it possible to provide a vector normalizing apparatus used to perform similarity discrimination of higher accuracy.

What we claim is:

1. A vector normalizing apparatus for optically normalizing a vector, comprising:
    a light source;
    first and second display means for displaying the components of the vector on the corresponding pixels thereof;
    a first guiding means for guiding the light from the light source to the second display means via the first display means;
    a detecting means for detecting the intensity of the light from the second display means;
    a first calculating means for calculating the square-root of an output of said detecting means;

a second calculating means for calculating the reciprocal of an output of said first calculating means;

a filter means for filtering a light by varying the transmittance thereof according to the output of said second calculating means; and a second guiding means for guiding the light from the light source to the filter means via the first display means.

2. A vector normalizing apparatus according to claim 1, further comprising:

a norm calculating means for calculating a norm of the vector;

a norm information calculating means for calculating a value by applying a function to the norm calculated by said norm calculating means; and a norm information adding means for adding an output of the norm information calculating means as a component to the vector, wherein the vector is displayed by said first and second display means after being processed by said norm information adding means.

3. A vector normalizing apparatus according to claim 1, further comprising:

a norm calculating means for calculating a norm of the vector:

a vector component adjusting means for normalizing the vector by using an output of said norm calculating means;

a norm information calculating means for calculating a value by applying a function to the norm calculated by said norm calculating means; and a norm information adding means for adding an output of the norm information calculating means as a component to the vector normalized by said vector component adjusting means;

wherein the vector is displayed by said first and second display means after being processed by said norm information adding means.

4. A vector normalizing apparatus according to claim 3, wherein said norm information calculating means uses a decreasing function.

5. A vector normalizing apparatus according to claim 4, wherein the decreasing function used in said norm information calculating means is given by $$f(D)=\{(\cos kD - \cos \Delta\theta)/(1-\cos kD)\}^{1/2}$$

where D is the L2-norm, f(D) is a function of the L2-norm D, and k and $\Delta\theta$ are arbitrary constants.

6. A vector normalizing apparatus for normalizing a vector, comprising:

a first norm calculating means for calculating a norm of the vector;

a norm information calculating means for calculating a value by applying a function to the norm calculated by said norm calculating means;

a norm information adding means for adding the output of said norm information calculating means as a component to the vector;

a second norm calculating means for calculating an L2-norm of the vector output of said norm information adding means; and a vector component adjusting means for adjusting the component of the vector output of said norm information adding means to normalize the vector by using the L2-norm calculated by said second norm calculating means.

7. A vector normalizing apparatus according to claim 6, further comprising:

a second vector component adjusting means for adjusting the component of the vector before the output of said norm information calculating means is added by said norm information adding means to normalize the vector by using the output of said first norm calculating means.

8. A vector normalizing apparatus according to claim 7, wherein said norm information calculating means uses a decreasing function.

9. A vector normalizing apparatus according to claim 8, wherein the decreasing function used in said norm information calculating means is given by $$f(D)=\{(\cos kD - \cos \Delta\theta)/(1-\cos kD)\}^{1/2}$$

where D is the L2-norm, f(D) is a function of the L2-norm D, and k and $\Delta\theta$ are arbitrary constants.

10. A vector normalizing apparatus for optically normalizing a vector, comprising:

a display means for displaying the components of the vector on the corresponding pixels thereof;

a first light source for illuminating said display means;

first and second light modulating means for modulating light illuminating thereon according to the image projected thereon;

a first guiding means for guiding the light from said first light source to said first and second light modulating means simultaneously via said display means, and for projecting the images displayed on said display means onto said first and second light modulating means;

a second light source;

a detecting means for detecting the intensity of light;

a second guiding means for guiding the light from said second light source to said detecting means via said first light modulating means and said second light modulating means, successively;

a first calculating means for calculating the square-root of an output of said detecting means;

a second calculating means for calculating the reciprocal of an output of said first calculating means;

a transmittance varying means for varying the transmittance thereof according to the output of said second calculating means;

a third light modulating means; and a third guiding means for guiding the light from said first light source to said third light modulating means via said display means and said transmittance varying means, and for projecting the image displayed on said display means onto said third modulating means via said transmittance varying means.

11. A vector normalizing apparatus according to claim 10, further comprising:

a third calculating means for calculating a value by applying a function to the output of said first calculating means;

an emitting means for emitting light corresponding to an output of said third calculating means;

a third light source;

fourth and fifth light modulating means for modulating light illuminating thereon according to an image projected thereon;

a fourth guiding means for guiding light from said third light source to said fourth and fifth light modulating means, simultaneously, via said third light modulating means, and for projecting the image combined from said third light modulating means and light from said emitting means onto said fourth and fifth modulating means;

a fourth light source;

a second detecting means for detecting an intensity of light;

a fifth guiding means for guiding light from said fourth light source to said second detecting means via said fourth light modulating means and said fifth light modulating means, successively;

a fourth calculating means for calculating the square-root of an output of said second detecting means;

a fifth calculating means for calculating the reciprocal of an output of said fourth calculating means;

a sixth light modulating means; and a sixth guiding means for guiding combined light from said third light modulating means guided by said third light guiding means and light from said emitting means to said sixth light modulating means, and for projecting the combined image projected by said third guiding means and the light from said emitting means onto said sixth light modulating means, wherein the modulation of said third light modulating means is controlled by the output of said fifth calculating means.

12. A vector normalizing apparatus according to claim 11, wherein said third calculating means uses a decreasing function.

13. A vector normalizing apparatus according to claim 12, wherein the decreasing function used in said norm information calculating means is given by $$f(D)=\{(\cos kD-\cos \Delta\theta)/(1-\cos kD)\}^{1/2}$$

where D is the L2-norm, f(D) is a function of the L2-norm D, and k and θ are arbitrary constants.

14. A vector normalizing apparatus for normalizing a vector, comprising:

a first light source;

a display means for displaying the vector;

a light modulating means for modulating an intensity of light illuminating thereon according to the square of the image intensity projected thereon;

a first guiding means for guiding the light from said first light source to said light modulating means via said display means:

a second light source;

a detecting means for detecting the intensity of the light;

a second guiding means for guiding the light from said second light source to said detecting means via said light modulating means;

a first calculating means for calculating the square-root of an output of said detecting means;

a second calculating means for calculating the reciprocal of an output of said first calculating means;

a filter means for filtering a light by varying the transmittance thereof according to the output of said second calculating means; and a third guiding means for guiding the light from said light source to said filter means via said display means.

15. A vector normalizing apparatus comprising:

an input vector acquiring device;

an input vector display device in communication with said input vector acquiring device;

a normalized vector output device disposed proximate to said input vector display device;

a vector transmitting device disposed between said input vector display device and said normalized vector output device such that said vector transmitting device transmits input vector data output from said input display device to said normalized vector output device;

a vector component adjusting device disposed between said vector transmitting device and said normalized vector output device such that said vector component adjusting device normalizes said input vector data transmitted by said vector transmitting device before said input vector data reaches said normalized vector output device; and an L2-norm calculating device constructed and arranged to be in communication with said input vector display device and said vector component adjusting device, said L2-norm calculating device comprising a vector component squaring device, a summation device, and a square-root calculating device.

16. A vector normalizing apparatus according to claim 15, wherein said input vector acquiring device comprises an optical image pickup device and a frame memory, said input vector display device comprises a first spatial light modulator and a combination of a first controller and a first driver, whereby said first driver drives said first spatial light modulator according to information sent from said input vector acquiring device, said normalized vector output device comprises a second spatial light modulator and a combination of a second controller and a second driver, whereby said second driver drives said second spatial light modulator according to information sent from said vector component adjusting device and is in image forming relation with said first spatial light modulator, and said vector component device comprises a transmittance varying shutter disposed between said vector transmitting device and said normalized vector output device.

17. A vector normalizing apparatus according to claim 16, wherein said L2-norm calculating device includes a third spatial light modulator constructed and arranged to be in communication with said input vector acquiring device and in image forming relation with said first light modulator, a summation device condenser lens disposed on a light output side of said third spatial light modulator, and a light detector disposed substantially at a focal plane of said summation device condenser lens.

18. A vector normalizing apparatus according to claim 16, wherein said optical image pickup device is a CCD device, said first spatial light modulator is a transmission type, electrically addressed liquid-crystal spatial light modulator, and said second spatial light modulator is a reflection type, optically addressed liquid-crystal spatial light modulator.

19. A vector normalizing apparatus according to claim 15, wherein said L2-norm calculating device includes third and fourth spatial light modulators which are either integral or disposed adjacent to each other such that each is in an image forming relation with said first light modulator, a first small-aperture lens disposed in an optical path between said first spatial light modulator and said third spatial light modulator, a second small-aperture lens disposed in an optical path between said first spatial light modulator and said fourth spatial light modulator, an image inverting prism disposed in said optical path between said second small-aperture lens and said first spatial light modulator, a first beam splitter disposed on a light output side and in close proximity to said third spatial light modulator, and a second beamsplitter disposed on a light output side and in close proximity to said fourth spatial light modulator.

20. A vector normalizing apparatus according to claim 15, further comprising:

a norm information calculating device that is in communication with said L2-norm calculating device; and a norm information adding device that is in communication with said norm information calculating device and said normalized vector output device, said norm information adding device adding norm information output by said norm information calculating device as a norm information component of a normalized output vector.

* * * * *